(12) United States Patent
Kakiuchi et al.

(10) Patent No.: US 12,017,891 B2
(45) Date of Patent: Jun. 25, 2024

(54) CRAWLER SUSPENDING DEVICE

(71) Applicant: KOBELCO CONSTRUCTION MACHINERY CO., LTD., Hiroshima (JP)

(72) Inventors: Kazuya Kakiuchi, Hyogo (JP); Yasuhiko Murayama, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 470 days.

(21) Appl. No.: 17/312,649

(22) PCT Filed: Dec. 5, 2019

(86) PCT No.: PCT/JP2019/047667
§ 371 (c)(1),
(2) Date: Jun. 10, 2021

(87) PCT Pub. No.: WO2020/129679
PCT Pub. Date: Jun. 25, 2020

(65) Prior Publication Data
US 2022/0041408 A1      Feb. 10, 2022

(30) Foreign Application Priority Data

Dec. 17, 2018 (JP) .................................. 2018-235772
Oct. 10, 2019 (JP) .................................. 2019-187064

(51) Int. Cl.
*B66C 1/24*      (2006.01)
*B62D 55/32*     (2006.01)

(52) U.S. Cl.
CPC ................ *B66C 1/24* (2013.01); *B62D 55/32* (2013.01)

(58) Field of Classification Search
CPC .................................. B66C 1/24; B62D 55/32
(Continued)

(56) References Cited

U.S. PATENT DOCUMENTS 4,245,861 A * 1/1981 Harry ........................ B66C 1/54
                                                    294/94
4,717,188 A * 1/1988 Johnston ................... B66C 1/24
                                                    294/67.2

(Continued)

FOREIGN PATENT DOCUMENTS

CN    105128959 A    12/2015
CN    107531465 A    1/2018

(Continued)

OTHER PUBLICATIONS

International Search Report dated Feb. 10, 2020 in PCT/JP2019/047667 filed on Dec. 5, 2019, 2 pages.

(Continued)

*Primary Examiner* — Paul T Chin
(74) *Attorney, Agent, or Firm* — Oblon, McClelland, Maier & Neustadt, L.L.P.

(57) ABSTRACT

A crawler frame has a crawler frame outer surface that is opposite to a surface via which the crawler frame is attached to a traveling body main part in the left-right direction. A bracket includes an attaching part, a circuitous part, and a crawler lifting section. The attaching part is attached to the crawler frame outer surface. The circuitous part is partially arranged below and above a crawler belt on an outer side thereof in the left-right direction, and extends around the crawler belt. The crawler lifting section is connected to the circuitous part and arranged above the crawler belt for receiving the crawler lifting tool.

9 Claims, 9 Drawing Sheets

(58) Field of Classification Search
USPC .......................................................... 294/82.1
See application file for complete search history.

(56) References Cited

U.S. PATENT DOCUMENTS

| | | | | |
|---|---|---|---|---|
| 4,784,419 | A * | 11/1988 | Jensen ...................... | B66C 1/24 294/67.2 |
| 4,810,016 | A * | 3/1989 | Greenhow ................ | B66C 1/24 294/67.21 |
| 5,688,010 | A * | 11/1997 | Moyer ...................... | B66C 1/24 294/67.2 |
| 2004/0084916 | A1* | 5/2004 | Cronk ....................... | B66C 1/24 294/67.1 |
| 2009/0200091 | A1 | 8/2009 | Porubcansky et al. | |
| 2009/0200860 | A1 | 8/2009 | Pech et al. | |
| 2009/0200861 | A1 | 8/2009 | Pech et al. | |
| 2015/0210514 | A1 | 7/2015 | Albinger et al. | |
| 2015/0210515 | A1 | 7/2015 | Pech et al. | |
| 2016/0145079 | A1* | 5/2016 | Pulido ...................... | B66C 1/24 294/67.22 |
| 2018/0022585 | A1 | 1/2018 | Miyazaki | |
| 2019/0177134 | A1 | 6/2019 | Pech et al. | |
| 2019/0262953 | A1* | 8/2019 | Mori ........................ | B23P 19/04 |
| 2021/0009386 | A1 | 1/2021 | Pech et al. | |

FOREIGN PATENT DOCUMENTS

| | | |
|---|---|---|
| JP | 6-16388 A | 1/1994 |
| JP | 2002-362878 A | 12/2002 |
| JP | 2003-127915 A | 5/2003 |
| JP | 2017-13676 A | 1/2017 |
| JP | 2017-504543 A | 2/2017 |
| JP | 2018-52218 A | 4/2018 |
| JP | 2018-70339 A | 5/2018 |

OTHER PUBLICATIONS

Combined Chinese Office Action and Search Report dated Sep. 29, 2022 (with English summary), 8 pages.

\* cited by examiner

CRAWLER SUSPENDING DEVICE

TECHNICAL FIELD

The present invention relates to a crawler hanging device for use in lifting a crawler.

BACKGROUND ART

Patent Literature 1 discloses a crawler of a working machine. The crawler is occasionally lifted by an auxiliary crane when the working machine is assembled and disassembled.

CITATION LIST

Patent Literature

Patent Literature 1: Japanese Unexamined Patent Publication No. 2018-52218

The crawler has a side-surface provided with a lifting ring (chain receiving member) on an outer side of the crawler in a left-right direction thereof. The crawler further has another side-surface provided with a lifting ring on an inner side thereof in the left-right direction to keep the crawler from turning over when the crawler is lifted. Besides, a member (lifting rope) for lifting the crawler is placed in each of the lifting rings on the inner side and the outer side of the crawler in the left-right direction. However, works of placing and removing the member for lifting the crawler in or from the lifting ring on the inner side of the crawler in the left-right direction are laborious in a narrow space between a traveling body main part (vehicle body part) and the crawler. This results in causing a problem that a work concerning lifting of the crawler becomes laborious.

SUMMARY OF INVENTION

An object of the present invention is to provide a crawler hanging device which can facilitate a work of lifting a crawler.

The present invention provides a crawler hanging device. The crawler hanging device is mounted onto a crawler for use in lifting the crawler, the crawler including a crawler frame having a pair of left and right side-surfaces and attachable to a main part of a traveling body, and a crawler belt surrounding the crawler frame from above, below, front, and rear thereof. The crawler hanging device includes at least one support member to be attached to the crawler. The at least one support member further includes: an attaching part to be attached to a crawler frame outer surface that is one of the pair of side-surfaces of the crawler frame and is opposite to a side-surface via which the crawler frame is to be attached to the main part of the traveling body; a first receiving part arranged above a belt top section of the crawler belt above the crawler frame for receiving a lifting tool for lifting the crawler; and a circuitous part which connects the attaching part and the first receiving part with each other, and extends around the belt top section of the crawler belt through an outside region of the belt top section in a left-right direction of the crawler belt.

DESCRIPTION OF EMBODIMENTS

First Embodiment

Hereinafter, a crawler hanging device 20 and a working machine 1 according to a first embodiment of the present invention will be described with reference to FIGS. 1 to 7.

Figure 1:
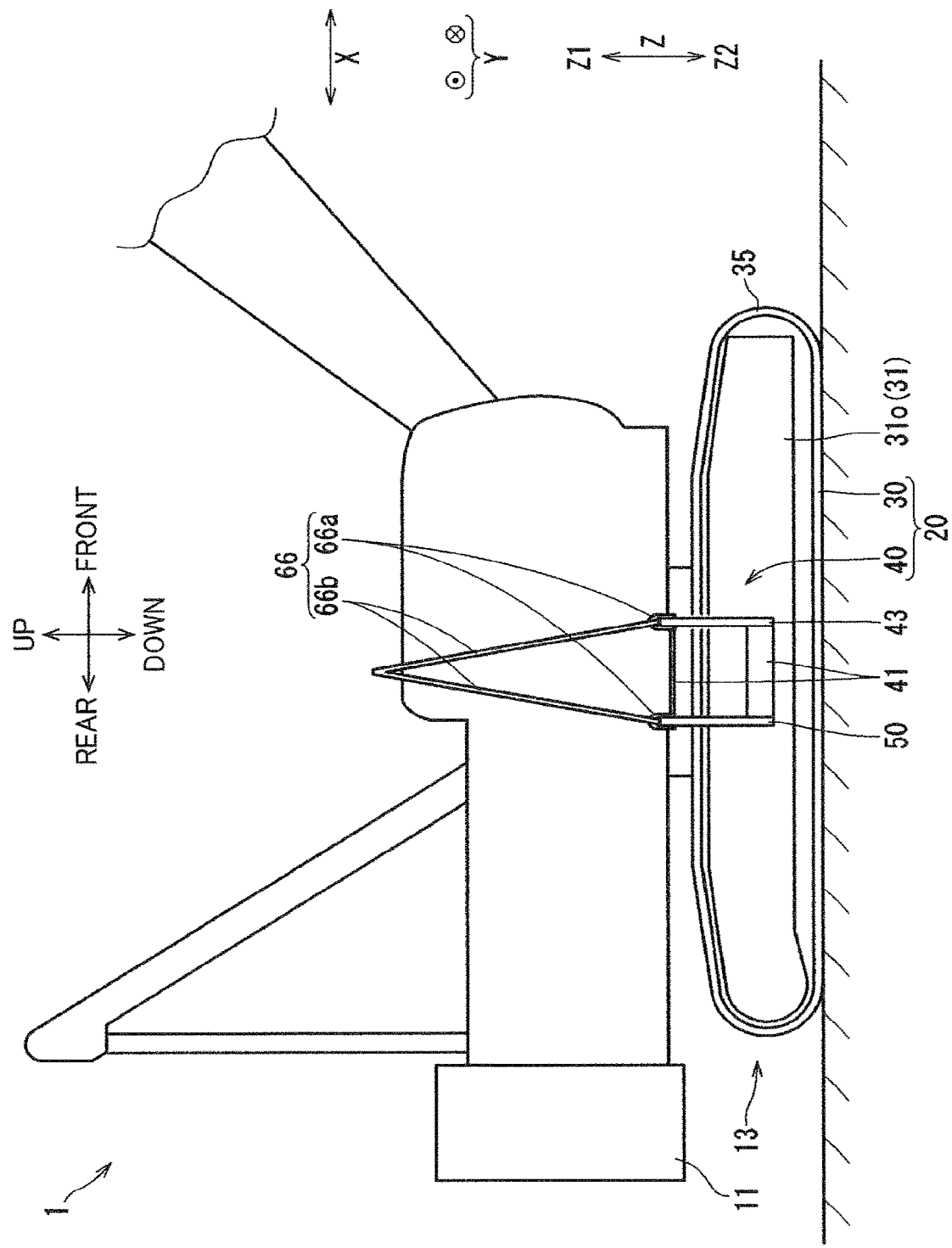
FIG. 1 is a sideview of a working machine including a crawler onto which a crawler hanging device according to a first embodiment of the present invention is mounted.

The working machine 1 (called a construction machine as well) includes, as shown in FIG. 1, a crawler 30 (lifting target) for which the crawler hanging device 20 (a bracket 40) according to the embodiment is adopted. The working machine 1 is a vehicle, such as a vehicle of a crawler-type and a working machine of a crawler-type, traveling by way of a crawler 30. The working machine 1 is, for example, a crawler crane. The working machine 1 includes an upper slewing body 11 and a lower traveling body 13.

The upper slewing body 11 is mounted on the lower traveling body 13 in an up-direction (Z1) and coupled to the lower traveling body 13 via a slewing bearing swingably with respect to the lower traveling body 13. It should be noted here that definitions of directions including the "up-direction" denoted by "Z1" will be described in detail later.

Figure 2:
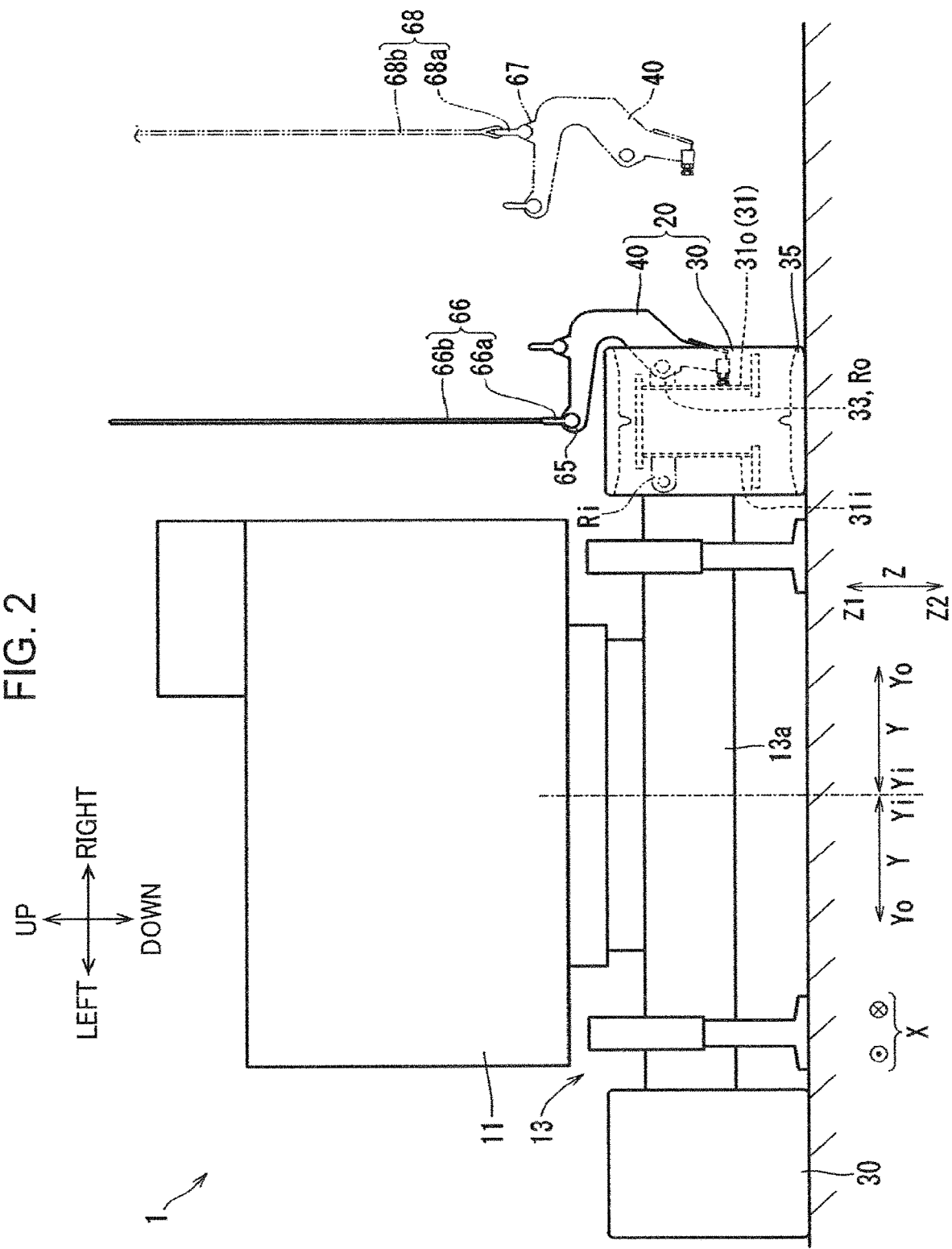
FIG. 2 is a rear view of the crawler onto which the crawler hanging device according to the first embodiment of the present invention is mounted.

The lower traveling body 13 causes the working machine 1 to travel. As shown in FIG. 2, the lower traveling body 13 has a traveling body main part 13a and a pair of left and right crawlers 30. The traveling body main part 13a serves as a frame (vehicle body frame) supporting the upper slewing body 11.

The crawler hanging device 20 is mounted onto the crawler 30 for use in lifting the crawler 30, and includes a bracket 40.

The left and right crawlers 30 are devices for causing the working machine 1 to travel. The left and right crawlers 30 are attachable to the traveling body main part 13a. The left and right crawlers 30 are arranged respectively on both sides (left and right sides) of the traveling body main part 13a in a left-right direction (in a traveling body transverse direction) thereof. Each of the left and right crawlers 30 extends in a front-rear direction (crawler front-rear direction) (see FIG. 1). The crawler 30 is attachable to and detachable from the traveling body main part 13a. The reason will be described below. The working machine 1 is disassembled to fall within a size limit of a transportation vehicle for transportation of the working machine 1. Here, the left and right crawlers 30, and the traveling body 13 are individually transported in a state where the left and right crawlers 30 are detached from the traveling body main part 13a. For this purpose, the left and right crawlers 30 are configured to be attachable to and detachable from the traveling body main part 13a. As shown in FIG. 1, each of the left and right crawlers 30 includes a crawler frame 31, a crawler-side attached part 33 (see FIG. 5), and a crawler belt 35.

Definitions of Directions

A longitudinal direction of the crawler 30 (lifting target) is defined as a "front-rear direction (crawler front-rear direction)" denoted by "X". As shown in FIG. 2, a direction in which the left and right crawlers 30 face each other in a state where the left and right crawlers 30 are attached to the traveling body main part 13a is defined as a "left-right direction (traveling body transverse direction)" denoted by "Y". Regarding the left-right direction, a direction of leaving away from a left-right directional center of the traveling body main part 13a is defined as being "outward in the left-right direction" or an "outer side in the left-right direction" denoted by "Yo", and a direction of coming closer to the left-right directional center of the traveling body main part 13a is defined as being "inward in the left-right direction" or an "inner side in the left-right direction" denoted by "Yi". A direction perpendicularly intersecting the front-rear direction and the left-right direction is defined as an "up-down direction" denoted by "Z" (up-direction Z1, down-direction Z2). The left and right crawlers 30 have the same configuration, and thus one of the left and right crawlers 30, specifically, the right crawler 30 will be described below.

Figure 5:
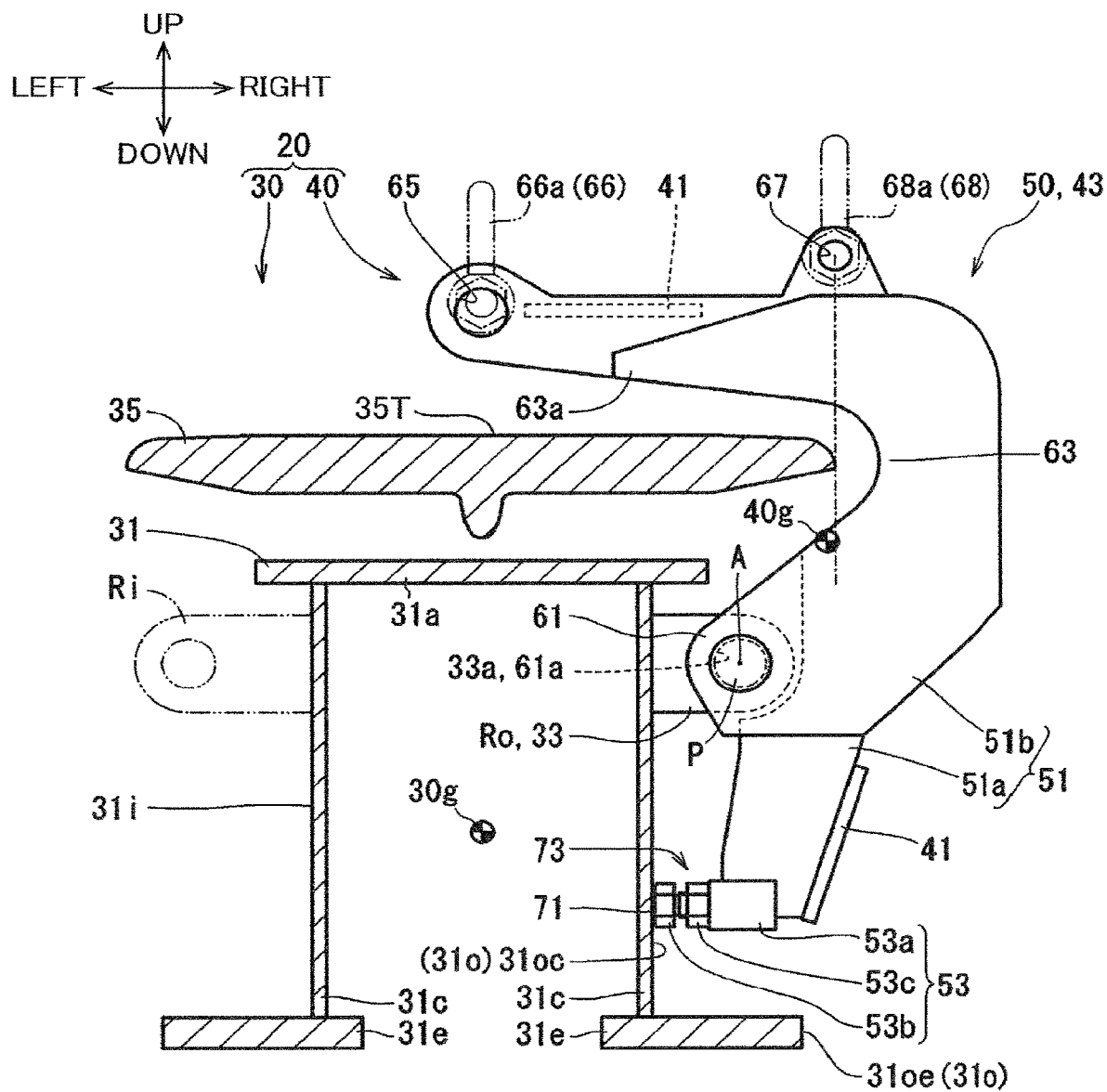
FIG. 5 is a cross-sectional view of the crawler and the crawler hanging device taken along the arrows F5-F5 in FIG. 3.
Figure 6:
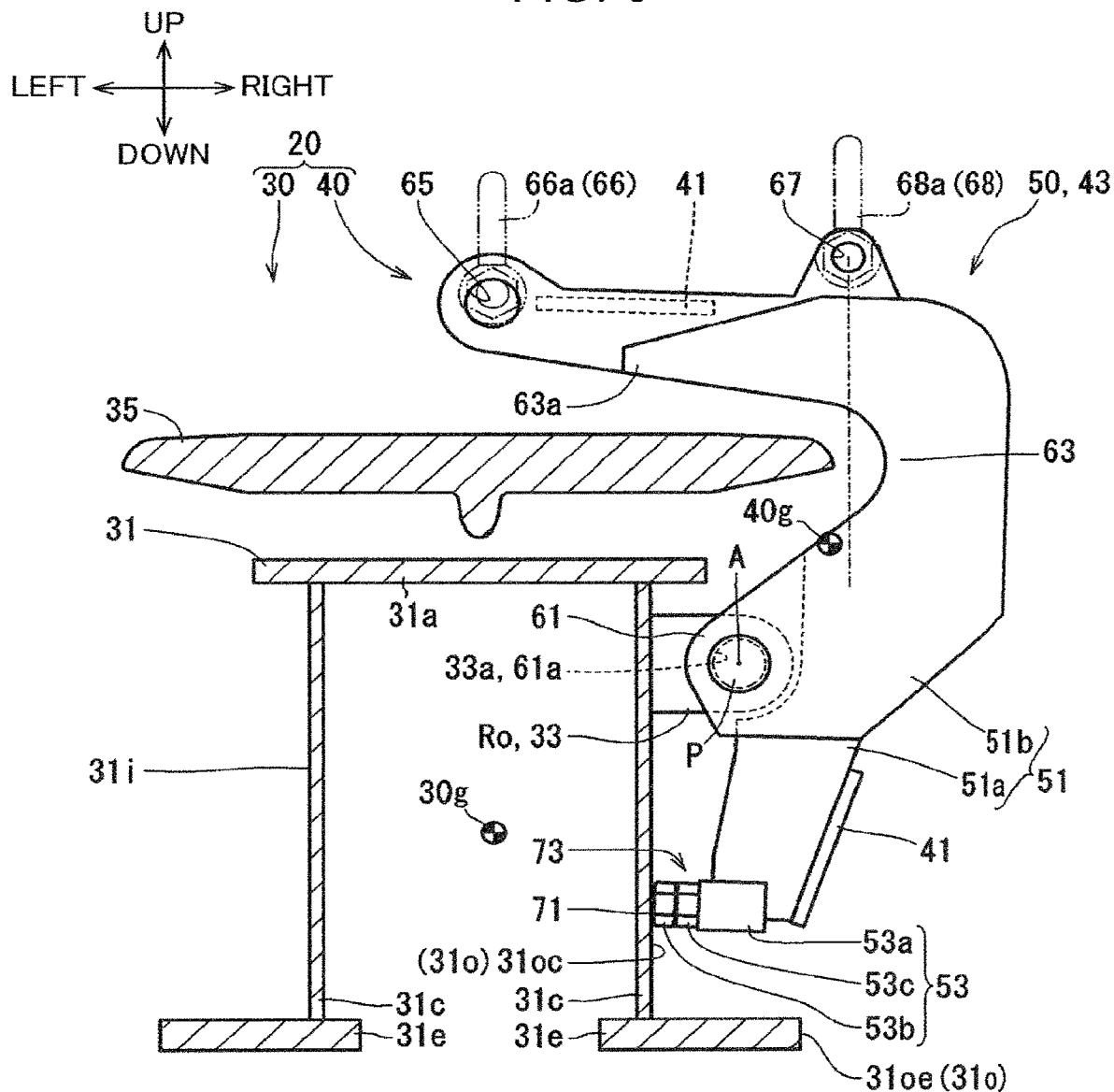
FIG. 6 is a cross-sectional view showing a state where the crawler lifting section is arranged on an outer side in the left-right direction than in a state shown in FIG. 5.
Figure 7:
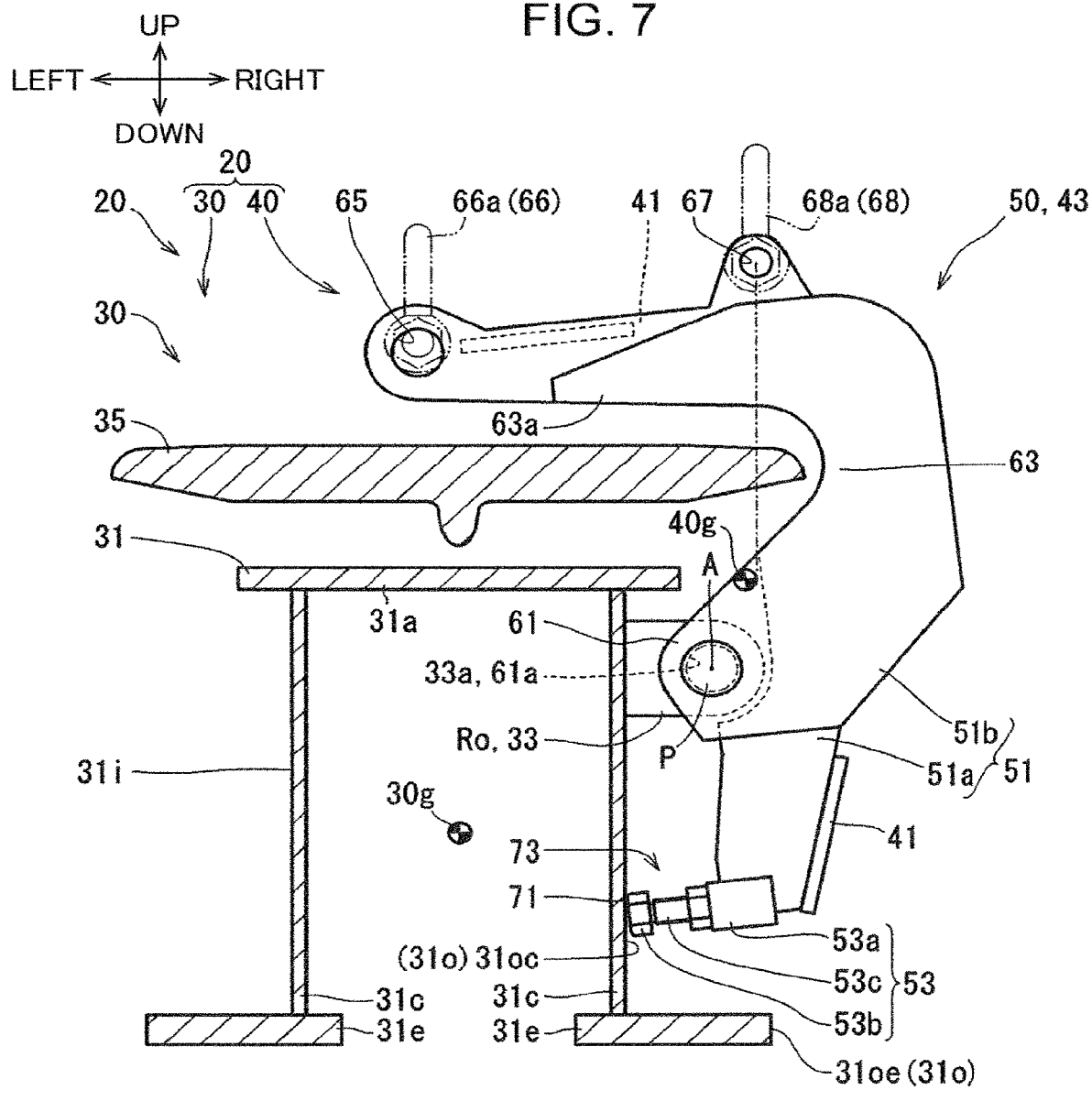
FIG. 7 is a cross-sectional view showing a state where the crawler lifting section is arranged on an inner side in the left-right direction than in the state shown in FIG. 5.

The crawler frame 31 has a pair of left and right side-surfaces and is attachable to the traveling body main part 13a. The crawler frame 31 serves as a long frame (assembly) extending in the front-rear direction. A cross-section of the crawler frame 31 seen in the front-rear direction has, for example, a rectangular or substantially rectangular shape. As shown in FIG. 5, the crawler frame 31 has a top member 31a, a pair of left and right side-plates 31c extending in the up-down direction, and a pair of left and right bottom members 31e. The crawler frame 31 further has a crawler frame inner surface 31i and a crawler frame outer surface 31o (lifting-target outer surface).

The top member 31a is located in an upper portion of the crawler frame 31. For instance, the top member 31a is a plate (top plate) lying in the left-right direction and the front-rear direction. Each of the side-plates 31c extends downward from the top member 31a. Each of the side-plates 31c extends in each direction (each of the up-down direction and the front-rear direction) perpendicularly intersecting the left-right direction. The left and right side-plates 31c are disposed respectively on both sides (left and right sides) of the crawler frame 31. The bottom members 31e are arranged in the same manner. The left and right side-plates 31c may be connected with each other in the left-right direction via an unillustrated connector in place of the top member 31a. Unless otherwise noted, one side-plate 31c (right side-plate in FIG. 5), which is on the outer side in the left-right direction, of the left and right side-plates 31c is just referred to as the side-plate 31c below. The definition is applied to the bottom members 31e as well. The bottom member 31e is a member (e.g., a bottom plate) located in a lower portion (e.g., at a lower end) of the crawler frame 31. An unillustrated roller to come into contact with the crawler belt 35 is arranged between the left and right bottom members 31e. The bottom member 31e horizontally lies below the side-plate 31c. The bottom member 31e has a width (or a lateral dimension) in the left-right direction larger than a width (or a thickness) of the side-plate 31c in the left-right direction. The bottom member 31e extends from the side-plate 31c inward and outward in the left-right direction. Specifically, the bottom member 31e is connected to the side-plate 31c in such a manner as to extend from a lower end of the side-plate 31c at least outward in the left-right direction. The bottom member 31e may be, for example, a plate extending in each direction (each of the front-rear direction and the transverse direction) perpendicularly intersecting the up-down direction, or may have a block shape.

The crawler frame inner surface 31i is a side-surface of the crawler frame 31 (on an inner side thereof in the left-right direction) via which the crawler frame is attached to the traveling body main part 13a (see FIG. 2). The crawler frame inner surface 31i serves as, for example, a left-right directional inner surface defined by the members (the left side-plate 31c and the left bottom member 31e on the inner side in the left-right direction in FIG. 5) constituting a left-right directional inner portion of the crawler frame 31. The crawler frame outer surface 31o (lifting-target outer surface) is a surface of the crawler frame 31 (on the outer side thereof in the left-right direction) that is opposite to the surface via which the crawler frame is attached to the traveling body main part 13a (see FIG. 2). The crawler frame outer surface 31o serves as, for example, a left-right directional outer surface of the members constituting a left-right directional outer portion of the crawler frame 31. Specifically, the crawler frame outer surface 31o incorporates a side-plate outer surface 31oc and a bottom member outer surface 31oe. The side-plate outer surface 31oc serves as a left-right directional outer surface of the side-plate 31c (the right side-plate in FIG. 5) on the outer side in the left-right direction and defines the crawler frame outer surface 31o. The bottom member outer surface 31oe serves as a left-right directional outer surface of the bottom member 31e on the outer side in the left-right direction and defines the crawler frame outer surface 31o.

The side-plate 31c is provided with a crawler-side attached part 33 (attached part) to which the bracket 40 is attached. The crawler-side attached part 33 protrudes from the crawler frame outer surface 31o (i.e., the side-plate outer surface 31oc) outward in the left-right direction. The crawler-side attached part 33 has, for example, a plate shape, that is, a plate shape extending in the up-down direction and the left-right direction (with a thickness extending in the front-rear direction). The crawler-side attached part 33 has a crawler pin hole 33a. The crawler pin hole 33a is a through hole (specifically defined by an inner surface) for allowing a pin P to be placed therein.

As shown in FIG. 1, the crawler belt 35 is wound on a periphery of the crawler frame 31, specifically, surrounds the crawler frame 31 from above, below, front, and rear thereof. The crawler belt 35 is mounted onto the crawler frame 31 via the unillustrated roller, and is driven by an unillustrated traveling motor provided at the crawler frame 31. The crawler belt 35 is formed of a plurality of crawler shoes 35a (see FIG. 3) connected to one another.

The bracket 40 is a member for lifting the crawler 30. The bracket 40 is to be attached to the crawler 30 detachably from the crawler 30. The bracket 40 includes a front and rear bracket connection part 41 (connection part), a front bracket 43 (front support member), and a rear bracket 50 (rear support member). The bracket 40 may include at least one bracket (support member) to be attached to the crawler 30. In this case, the front and rear bracket connection part 41 is excludable.

The front and rear bracket connection part 41 is connected to the front bracket 43 and the rear bracket 50. The definition of the term "connected" here covers direct connection and indirect connection. This definition is applicable to the term "connected" and similar terms in the remaining description below. The front and rear bracket connection part 41 fixedly connects the front bracket 43 and the rear bracket 50 with each other in the front-rear direction. The front and rear bracket connection part 41 may be fixedly welded to the front bracket 43 and the rear bracket 50 or fastened thereto by a fastening member, e.g., a bolt (see a fastening member 242 shown in FIG. 8). A front-rear directional force may act on the front bracket 43 and the rear bracket 50 when the crawler 30 is lifted. Specifically, a force of causing the front bracket 43 and the rear bracket 50 to approach each other (or leave away from each other) in the front-rear direction may act on the front bracket 43 and the rear bracket 50. In this case, the front and rear bracket connection part 41 encourages the force. The front and rear bracket connection part 41 may be located, for example, in an upper portion of the bracket 40, in a lower portion of the bracket 40, or in a central portion of the bracket 40 in the up-down direction (not shown). The front and rear bracket connection part 41 may have a member extending (arranged to extend) in the front-rear direction. For instance, the front and rear bracket connection part 41 may have a plate-like member extending in the front-rear direction, or may have a rod-like member extending in the front-rear direction (see a front and rear bracket connection part 241 shown in FIG. 8). The "member extending in the front-rear direction" can range from a single member to a plurality of members.

The front bracket 43 has the same or substantially the same configuration as the rear bracket 50. For instance, the front bracket 43 and the rear bracket 50 are symmetrical in the front-rear direction. The front bracket 43 also preferably includes all the structural elements of the rear bracket 50. However, the front bracket 43 may partly exclude the structural elements of the rear bracket 50. FIG. 5 is a cross-sectional view taken along the arrows F5-F5 in FIG. 3. In the cross-sectional view, the rear bracket 50 and other elements are seen from the rear of the rear bracket 50. Alternatively, FIG. 5 may serve as a view horizontally flipped to show the front bracket 43 and other elements seen from the front of the front bracket 43. The showing way is applicable to FIGS. 6 and 7.

The rear bracket 50 is arranged individually from the front bracket 43 and is at a distance from the front bracket 43 in the front-rear direction. As shown in FIG. 5, the rear bracket 50 has a curve shape, for example, may have a substantially L-shape and a substantially C-shape. The rear bracket 50 includes a frame 51 and an adjuster 53. From the operable perspective of each of the structural elements of the rear bracket 50, the rear bracket 50 includes an attaching part 61, a circuitous part 63, a crawler lifting section 65 (first receiving part), a bracket lifting section 67 (second receiving part), a rotation restricting part 71, and a position adjusting part 73. For instance, the attaching part 61, the circuitous part 63, the crawler lifting section 65, and the bracket lifting section 67 are provided at the frame 51. For example, the rotation restricting part 71 and the position adjusting part 73 are provided at the adjuster 53.

Figure 3:
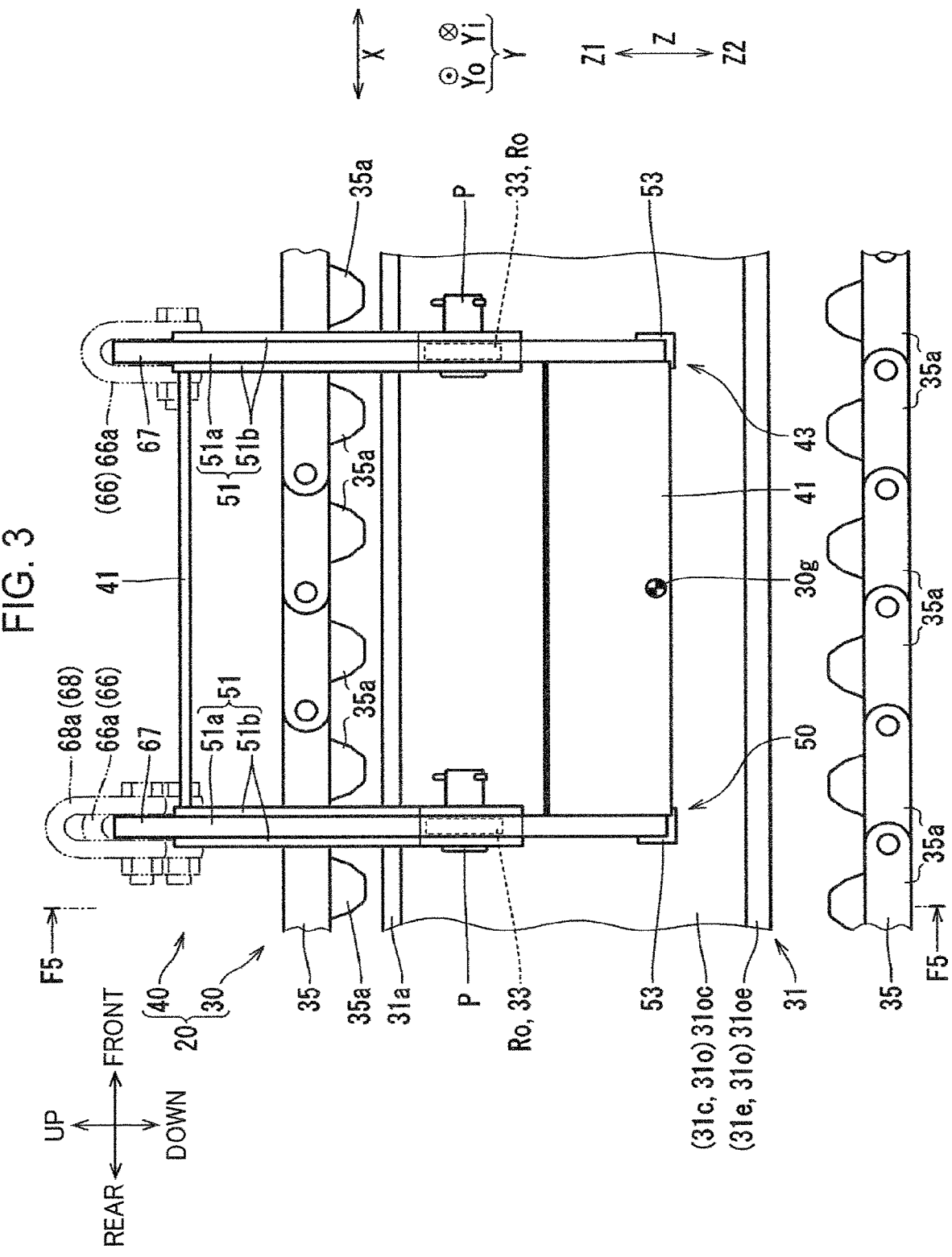
FIG. 3 is an enlarged sideview of the crawler onto which the crawler hanging device according to the first embodiment of the present invention is mounted.

The frame 51 is an assembly mostly occupying the rear bracket 50. The frame 51 has, for example, a plate shape. As shown in FIG. 3, the frame 51 includes, for example, three plates, specifically, a center plate 51a and two front and rear plates 51b. The front and rear plates 51b are fixedly attached to the center plate 51a to sandwich the center plate 51a therebetween from both front and rear thereof in the front-rear direction.

As shown in FIG. 5, the adjuster 53 forms the rotation restricting part 71 and the position adjusting part 73. The adjuster 53 has, for example, a bolt engagement part 53a, a bolt 53b, and a nut 53c. The bolt engagement part 53a is fixedly fastened to the frame 51. The bolt 53b (an adjustment bolt, a lifting position adjusting bolt) is placed in (engaged with) the bolt engagement part 53a to be fasten to the frame 51 via the bolt engagement part 53a. The nut 53c receives (is engaged with) the bolt 53b therein for allowing the bolt 53b to be fixedly engaged with the bolt engagement part 53a (to be fastened to the frame 51). Meanwhile, another adjuster having the same operability as the adjuster 53 shown in FIG. 5 may be provided between the front bracket 43 and the rear bracket 50 in the front-rear direction shown in FIG. 3 (e.g., the front and rear bracket connection part 41 may be provided with another adjuster). In this case, a frame at least partly having the same configuration as the frame 51 may be fixedly connected to the front and rear bracket connection part 41, and the frame may have, for example, a lower end provided with an adjuster. The frame may be, for example, made of same material as that of the center plate 51a of the frame 51, or that of a lower portion of the center plate 51a. Moreover, the frame may be made of same material as that of a specific portion of the frame 51 that comes into contact with the front and rear bracket connection part 41 at a lower position (or a specific portion thereof that comes into contact with the front and rear bracket connection part 241 and the fastening member 242 shown in FIG. 9), and the periphery therearound.

The attaching part 61 is detachably attached to the crawler frame outer surface 31o (i.e., the side-plate outer surface 31oc). The attaching part 61 is attached to the crawler frame outer surface 31o via the crawler-side attached part 33. For instance, the attaching part 61 is composed of the two front and rear plates 51b (see FIG. 3). The attaching part 61 is arranged such that the two front and rear plates 51b thereof sandwich the crawler-side attached part 33 in the front-rear direction. Alternatively, the crawler-side attached part 33 may include two plate-like members to sandwich an attaching part 61 constituted by a single plate therebetween. The attaching part 61 is attached to the crawler-side attached part 33 on the crawler frame outer surface 31o rotatably about a rotational axis A (rotation central axis) extending in the front-rear direction. The attaching part 61 is easily attachable to the crawler-side attached part 33 via a pin P. The attaching part 61 has a bracket pin hole 61a.

The bracket pin hole 61a is a pin hole (specifically defined by an inner surface) for allowing the pin P to be placed therein. For example, the bracket pin hole 61a penetrates through the front and rear plates 51b (see FIG. 3) in the front-rear direction. The pin P connects the crawler frame outer surface 31o and the attaching part 61 to each other. The pin P passes through the crawler pin hole 33a of the crawler-side attached part 33 and the bracket pin hole 61a of the attaching part 61. The crawler pin hole 33a has a dimension (an inner diameter) equal to or substantially equal to a dimension (an inner diameter) of the bracket pin hole 61a. However, one of the bracket pin hole 61a and the crawler pin hole 33a may be larger than the other. For instance, one of the bracket pin hole 61a and the crawler pin hole 33a may have a diameter larger than a diameter of the other. For example, at least one of the bracket pin hole 61a and the crawler pin hole 33a may be longer than the other. In these cases, the pin P can easily pass through the bracket pin hole 61a and the crawler pin hole 33a regardless of a misalignment between the pin holes (see a second embodiment to be described later for misalignment between holes).

The circuitous part 63 is partially arranged below and above the crawler belt 35 on an outer side thereof in the transverse direction, and extends around the crawler belt 35 in a state where the bracket 40 is attached to the crawler frame outer surface 31o. Unless otherwise noted, described hereinafter is the state where the bracket 40 is attached to the crawler frame outer surface 31o. The circuitous part 63 has a curve shape, for example, a C-shape when seen in the front-rear direction. The circuitous part 63 is connected to the attaching part 61 and arranged above the attaching part 61. The circuitous part 63 is, for example, constituted by the frame 51. The circuitous part 63 includes a beam section 63a. The beam section 63a extends in the left-right direction above the crawler belt 35. The beam section 63a connects the crawler lifting section 65 and the bracket lifting section 67 with each other. The beam section 63a is configured to avoid an interference with the crawler belt 35 when the bracket 40 is attached to and detached from the crawler frame outer surface 31o. Specifically, for instance, the beam section 63a has a lower end which tilts with respect to the left-right direction to be at a higher position on the inner side in the left-right direction, or extending in a direction agreeing with the left-right direction (see FIG. 7) in an "attaching state" of the bracket 40 to be described later.

Figure 4:
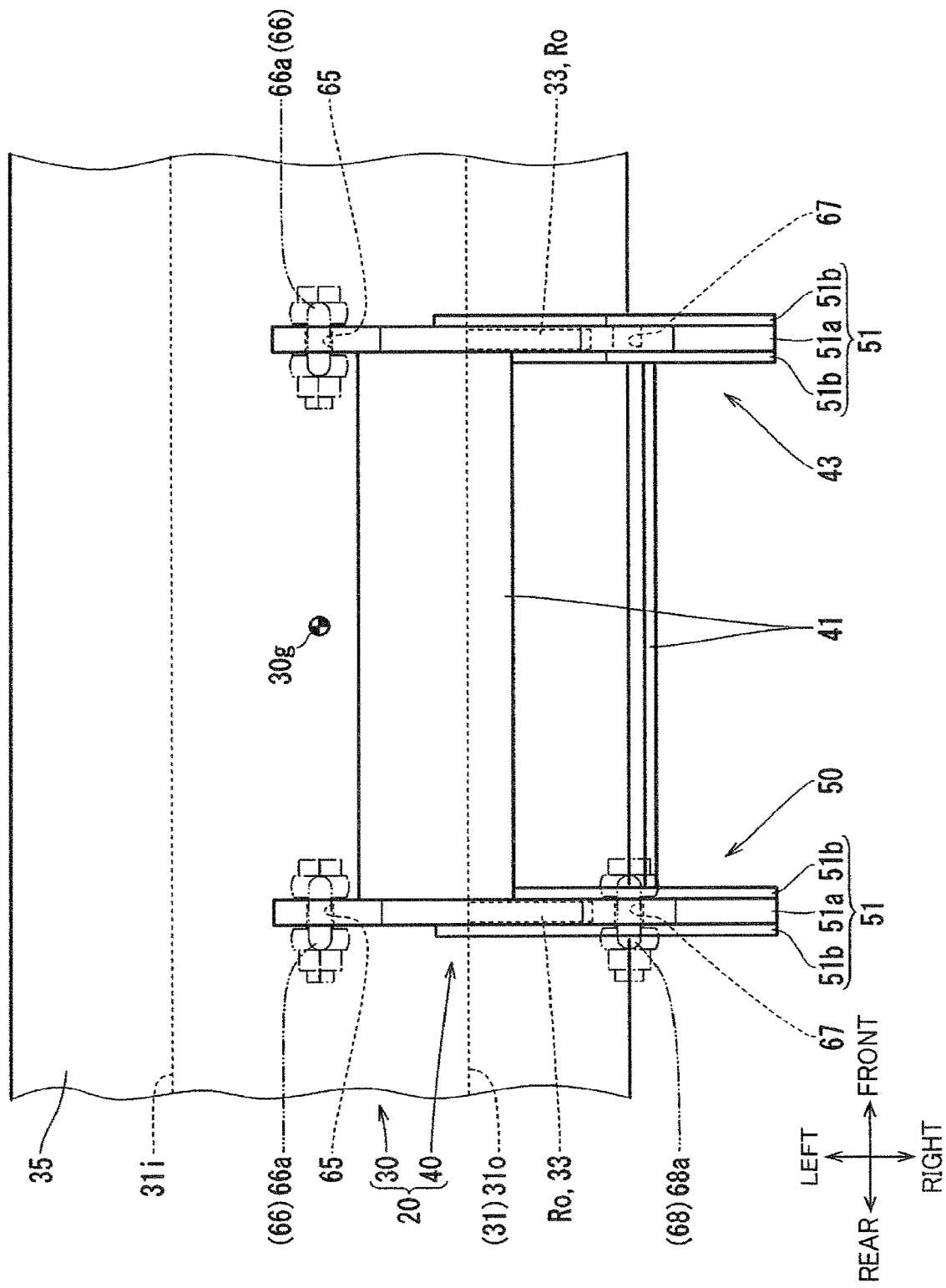
FIG. 4 is a plan view of the crawler hanging device shown in FIG. 3.

The crawler lifting section 65 (lifting-target lifting section, crawler-lifting lifted part) serves as a lifting position for receiving a crawler lifting tool 66 (lifting tool). The crawler lifting section 65 is located in the upper portion of the bracket 40 on the inner side thereof in the left-right direction. The crawler lifting section 65 is connected to the circuitous part 63 on the inner side of the circuitous part 63 in the left-right direction. The crawler lifting section 65 is arranged above the crawler belt 35. The position of the crawler lifting section 65 in the left-right direction will be described later. As shown in FIG. 4, the crawler lifting section 65 has, for example, a hole (lifting hole) formed in the center plate 51a and a periphery therearound, namely, a hole penetrating through the center plate 51a in the front-rear direction and a periphery therearound.

In other words for the crawler lifting section 65, the crawler lifting section 65 is arranged above a belt top section 35T (see FIG. 5) of the crawler belt 35 above the crawler frame 31 for receiving the crawler lifting tool 66 for lifting the crawler 30. That is to say, the crawler lifting section 65 is arranged above the attaching part 61 across the belt top section 35T. As shown in FIG. 5, the belt top section 35T of the crawler belt 35 extends longer than the crawler frame 31 (top member 31a) at the opposite ends thereof (at least extend outward) in the left-right direction. Consequently, the circuitous part 63 having the curve shape can connect the attaching part 61 and the crawler lifting section 65 with each other by extending around the extension of the belt top section 35T through an outside region of the belt top section 35T in the left-right direction.

The crawler lifting tool 66 is a member for lifting the crawler 30. For instance, as shown in FIG. 2, the crawler lifting tool 66 has a shackle 66a and a rope 66b. The shackle 66a is engaged with the crawler lifting section 65. The rope 66b is connected to the shackle 66a and an unillustrated hook of a crane for lifting the crawler 30. The "crane for lifting the crawler 30" may be art auxiliary crane for assembling and disassembling the working machine 1, or may be the working machine 1 without the crawler 30 dismounted therefrom (i.e., the working machine 1 may mount and dismount the crawler 30 thereto and therefrom by itself). Here, the crawler lifting tool 66 may have a configuration different from the above-described configuration. The definition is applicable to the bracket lifting tool 68 as well. For instance, a chain, a wire, a sling (e.g., a sling belt, a belt sling), or other member having a strip shape is adoptable in place of the rope 66b.

As shown in FIG. 5, the bracket lifting section 67 (bracket-lifting lifted part) serves as a lifting position for receiving the bracket lifting tool 68 (another lifting tool). The bracket lifting section 67 is located in the upper portion of the bracket 40. The bracket lifting section 67 is connected to the circuitous part 63 and arranged above the circuitous part 63. The bracket lifting section 67 is arranged on an outer side of the crawler lifting section 65 in the left-right direction. The bracket lifting section 67 is arranged above the crawler belt 35. The position of the bracket lifting section 67 in the left-right direction will be described later. As shown in FIG. 4, the bracket lifting section 67 has, for example, a hole (lifting hole) formed in the center plate 51a and a periphery therearound, namely, a hole penetrating through the center plate 51a in the front-rear direction and a periphery therearound.

In other words for the bracket lifting section 67, the bracket lifting section 67 is arranged in an upper portion of the rear bracket 50 (front bracket 43) on the outer side of the crawler lifting section 65 in the left-right direction above the crawler belt 35. The bracket lifting section 67 receives the bracket lifting tool 68 for lifting the rear bracket 50 when the attaching part 61 is attached to the crawler frame outer surface 31o.

The bracket lifting tool 68 is a member for lifting the bracket 40. As shown in FIG. 2, the bracket lifting tool 68 is configured, for example, in the same manner as the crawler lifting tool 66, and thus has a shackle 68a and a rope 68b.

As shown in FIG. 5, the rotation restricting part 71 (reaction force receiving part) is brought into contact with the crawler frame outer surface 31o to stabilize a state (posture, inclination) of each of the crawler 30 and the bracket 40 when the bracket 40 is attached to the crawler 30. Specifically, the rotation restricting part 71 restricts a rotation of the crawler 30 (about the rotational axis A) with respect to the bracket 40 in a lifted state of the crawler 30. The rotation restricting part 71 restricts a rotation of the bracket 40 (about the rotational axis A) with respect to the crawler 30 when the bracket 40 is attached to the crawler 30 in a non-lifted state of the crawler 30. The rotation restricting part 71 causes a left-right directional inner force to act on the crawler frame outer surface 31o. The rotation restricting part 71 may be brought into contact with the side-plate outer surface 31oc, or may be brought into contact with the bottom member outer surface 31oe (see FIG. 9, which will be described later). The rotation restricting part 71 is at such a position in the bracket 40 as to enable the restriction. The rotation restricting part 71 is linked to the attaching part 61. The rotation restricting part 71 is below the rotational axis A and is located below the attaching part 61. For instance, the rotation restricting part 71 is located in the lower portion (e.g., at a lower end) of the bracket 40 (front bracket 43, rear bracket 50). The rotation restricting part 71 can be directly brought into contact with the crawler frame outer surface 31o, or can be indirectly brought into contact with the crawler frame outer surface 31o (e.g., via a plate). The rotation restricting part 71 constitutes, for example, a leading end (a left-right directional inner end) of the bolt 53b. Alternatively, for instance, the rotation restricting part 71 may be a part of the frame 51 in absence of the position adjusting part 73. Moreover, the rotation restricting part 71 may be arranged above the attaching part 61 as described later. That is to say, the rotation restricting part 71 is located away from the attaching part 61 in the up-down direction, and is brought into contact with the crawler frame outer surface 31*o* to restrict the rotation of the rear bracket 50 about the rotational axis A.

The position adjusting part 73 adjusts the position of the crawler lifting section 65 in the left-right direction with respect to the crawler 30. More specifically, the position adjusting part 73 adjusts a relative position of the crawler lifting section 65 to the crawler 30 in the left-right direction by adjusting a relative position of the rotation restricting part 71 to the frame 51 in the left-right direction. The position adjusting part 73 is connected to the rotation restricting part 71, and lies between the frame 51 and the rotation restricting part 71. The position adjusting part 73 is located, for example, in the lower portion (e.g., at the lower end) of the bracket 40.

Operation and Gravity Center Position

The crawler hanging device 20 is configured to operate as described below.

Attachment of Bracket 40

A work of attaching the bracket 40 to the crawler 30 shown in FIG. 2 is performed in the following manner. The bracket lifting tool 68 is engaged with the bracket lifting section 67. The bracket 40 is lifted by an auxiliary crane via the bracket lifting tool 68 to come closer to the crawler frame outer surface 31*o* (i.e., the side-plate outer surface 31*oc*, see FIG. 5). More specifically, the attaching part 61 is caused to come closer to the crawler-side attached part 33 to align the crawler pin hole 33*a* and the bracket pin hole 61*a* with each other as shown in FIG. 5. A state where the bracket 40 is lifted via the bracket lifting tool 68 engaged with the bracket lifting section 67 and the bracket 40 is not attached to the crawler frame outer surface 31*o* is defined as a "lifted state" of the bracket 40.

Further, the attaching part 61 is attached to the crawler-side attached part 33. Specifically, the pin P passes through the crawler pin hole 33*a* and the bracket pin hole 61*a* to connect the crawler frame outer surface 31*o* and the bracket 40 (front bracket 43, rear bracket 50) to each other. The bracket 40 is thus rotatable about the rotational axis A. Then, the bracket lifting tool 68 is lowered. As a result, the bracket 40 rotates about the rotational axis A under its own weight of the bracket 40. The rotation restricting part 71 is brought into contact with the crawler frame outer surface 31*o*. A state where the attaching part 61 is attached to the crawler-side attached part 33 and the rotation restricting part 71 is in contact with the crawler frame outer surface 31*o* is defined as an "attaching state" of the bracket 40.

Gravity Center 40*g* of Bracket 40

As described above, the attaching part 61 is caused to come closer to the crawler-side attached part 33 in the lifted state of the bracket 40. At this time, an interference or a contact which may occur between the rotation restricting part 71 and the crawler frame outer surface 31*o* before the attaching part 61 and the crawler-side attached part 33 align with each other would make the work of attachment laborious. Specifically, the bracket 40 is required to rotate to align the attaching part 61 and the crawler-side attached part 33 with each other. Here, the bracket 40 is configured to reduce the laboriousness of the work of attachment. In detail, the following Conditions 1 and 2 are satisfied: Condition 1: The rotation restricting part 71 is located below the attaching part 61; Condition 2: The bracket 40 has a gravity center 40*g* to be set to a specific position on an inner side of the bracket lifting section 67 in the left-right direction in the attaching state of the bracket lifting section 40. Namely, the bracket 40 (rear bracket 50) has such a shape as to attain the setting; and Condition 2a: Under Condition 2, the position of the bracket lifting section 67 is defined as such a position in the bracket lifting section 67 as to retain the bracket lifting tool 68. Specifically, for instance, in a configuration where the bracket lifting section 67 has a hole defined by an inner surface with an upper end for retaining the bracket lifting tool 68, such a position of the bracket lifting section 67 as to satisfy Condition 2 is the upper end of the inner surface defining the hole of the bracket lifting section 67.

When Condition 1 and Condition 2 are satisfied, the bracket 40 rotates under its own weight of the bracket 40 with the lower portion of the bracket 40 being on the outer side in the left-right direction in accordance with a change in the state of the bracket 40 from the attaching state to the lifted state. At this time, a distance from the crawler frame outer surface 31*o* to the rotation restricting part 71 on the outer side in the left-right direction is longer than a distance from the crawler-side attached part 33 to the attaching part 61 on the outer side in the left-right direction. The rotation restricting part 71 is hence located away from the crawler frame outer surface 31*o* on the outer side thereof in the left-right direction when the attaching part 61 is caused to come closer to the crawler-side attached part 33, and the attaching part 61 and the crawler-side attached part 33 align with each other in the lifted state of the bracket 40. Owing to this location, an interference of the rotation restricting part 71 with the crawler frame outer surface 31*o* can be suppressed.

A relative position of the rotation restricting part 71 to the frame 51 shifts in response to an adjustment executed by the position adjusting part 73. As a result, the position of the gravity center 40*g* in the left-right direction also shifts. Accordingly, Condition 2 is preferably satisfied over an entire range including adjustable positions of the rotation restricting part 71 relative to the frame 51.

Condition 3: The gravity center 40*g* may be on a positional line on which the bracket lifting section 67 is located with respect to the left-right direction in the attaching stage of the bracket 40. In this case, the rotation restricting part 71 is brought into contact with the crawler frame outer surface 31*o* when the attaching part 61 is caused to come closer to the crawler-side attached part 33 to align the attaching part 61 and the crawler-side attached part 33 with each other in the lifted state of the bracket 40. At this time, the rotation restricting part 71 does not push the crawler frame outer surface 31*o* inward in the left-right direction, that is, receives no left-right directional outer reaction force from the crawler frame outer surface 31*o*. Hence, the posture (inclination) of the bracket 40 is easily maintainable before and after the alignment between the attaching part 61 and the crawler-side attached part 33. This can facilitate the work of attaching the bracket 40 to the crawler 30.

When Condition 3 is satisfied, the rotation restricting part 71 further serves as a guide for the alignment between the attaching part 61 and the crawler-side attached part 33. Specifically, the attaching part 61 and the crawler-side attached part 33 align with each other when the attaching part 61 is caused to come closer to the crawler-side attached part 33 and the rotation restricting part 71 is brought into contact with the crawler frame outer surface 31*o*. At this timing, the crawler pin hole 33*a* and the bracket pin hole 61*a* align with each other to thereby allow the pin P to pass through the pin holes. It is thus possible to easily perform the work of aligning the attaching part 61 and the crawler-side attached part 33 with each other. Here, a gap comes into existence between a leading end of the crawler-side attached part 33 on an outer side thereof in the left-right direction and a leading end of the center plate 51$a$ on an inner side thereof in the left-right direction when the crawler-side attached part 33 and the attaching part 61 align with each other. Due to the gap, the crawler-side attached part 33 and the attaching part 61 misalign with each other even when the attaching part 61 is caused to come closer to the crawler-side attached part 33 and the leading end of the crawler-side attached part 33 on the outer side thereof in the left-right direction comes into contact with the leading end of the center plate 51$a$ on the inner side thereof in the left-right direction. Here, the rotation restricting part 71 is utilized as the guide to facilitate the alignment between the crawler-side attached part 33 and the attaching part 61.

In contrast, when Condition 3 is unsatisfied, the position adjusting part 73 may adjust the position of the rotation restricting part 71 to satisfy Condition 3 (so that the rotation restricting part 71 serves as the guide). Specifically, the crawler-side attached part 33 and the attaching part 61 are aligned with each other (e.g., by way of the pin P) in the lifted state of the bracket 40. In this state, the position adjusting part 73 adjusts the position of the rotation restricting part 71 (e.g., by way of a manual operation of an operator) to bring the rotation restricting part 71 into contact with the crawler frame outer surface 31$o$. As a result, Condition 3 is satisfied.

A position of the gravity center 40$g$ of the bracket 40 on a much inner side of the bracket lifting section 67 in the left-right direction may cause drawbacks described below. An interference or a contact, which may occur between the bracket 40 and the crawler belt 35 before the attaching part 61 caused to come closer to the crawler-side attached part 33 align with the crawler-side attached part 33 in the lifted state of the bracket 40, may make the work of attachment more laborious. Specifically, the bracket 40 is required to rotate to align the attaching part 61 and the crawler-side attached part 33 with each other. Here, the gravity center 40$g$ is set to a position of avoiding such an interference between the bracket 40 and the crawler belt 35. More specifically, the gravity center 40$g$ of the bracket 40 in the attaching state is, for example, on an outer side of the rotational axis A in the left-right direction, on an outer side of the pin P in the left-right direction, or on an outer side of the crawler-side attached part 33 in the left-right direction. Furthermore, the gravity center 40$g$ of the bracket 40 in the attaching state may be on a positional line on which the bracket lifting section 67 (e.g., the center of the hole) is located or on an outer side of the positional line with respect to the left-right direction. In this case, Condition 2 is unsatisfied.

As described above, the bracket 40 rotates about the rotational axis A under its own weight of the bracket 40 when the bracket lifting tool 68 is lowered in the state where the attaching part 61 is attached to the crawler-side attached part 33. At this time, the lower portion of the bracket 40 below the rotational axis A shifts inward in the left-right direction. This shift brings the rotation restricting part 71 into contact with the crawler frame outer surface 31$o$. The rotation of the bracket 40 about the rotational axis A is thus restricted. The gravity center 40$g$ is set to such a position as to operate the bracket 40 in this way. Specifically, the bracket 40 (front bracket 43, rear bracket 50) has such a shape that the gravity center 40$g$ is on the outer side of the rotational axis A in the left-right direction in the attaching state of the bracket 40.

A work of detaching the bracket 40 from the crawler 30 is performed through a reverse (or substantially reverse) order of the work of attaching the bracket 40 to the crawler 30.

Lifting of Crawler 30

The work of lifting the crawler 30 is performed in a manner to be described below. The crawler lifting tool 66 is engaged with the crawler lifting section 65. An auxiliary crane lifts the bracket 40 in the attaching state, and the crawler 30 via the crawler lifting tool 66. The crawler 30 is then detached from the traveling body main part 13$a$. A state where the crawler 30 is lifted is defined as a "lifted state" of the crawler 30. The crawler 30 in the lifted state is attached to the traveling body main part 13$a$ through a reverse order of the foregoing. The crawler 30 in the lifted state preferably avoids inclining in the left-right direction and the front-rear direction of the crawler 30 with respect to a horizontal plane.

Gravity Center 30$g$ of Crawler 30

The crawler 30 in the lifted state preferably avoids inclining in the left-right direction of the crawler 30 with respect to the horizontal plane. Hence, the position of the crawler lifting section 65 in the left-right direction is adjusted to be on a positional line on which the gravity center 30$g$ of the crawler 30 is located or substantially on the positional line with respect to the left-right direction (see FIGS. 5 to 7). The position adjusting part 73 executes the adjustment. Specifically, the position adjusting part 73 adjusts the position of the rotation restricting part 71 relative to the frame 51 in the left-right direction. More specifically, for instance, an engagement amount of the bolt 53$b$ with respect to the bolt engagement part 53$a$ is adjusted. As a result, the position of the crawler lifting section 65 relative to the gravity center 30$g$ of the crawler 30 in the left-right direction is adjusted. Meanwhile, presumed is a case where a specific single bracket 40 is used peculiarly to a corresponding single crawler 30 without being used for another crawler 30. In this case, the rotation restricting part 71 may be designed in advance to prevent the crawler 30 from inclining in the left-right direction with respect to the horizontal plane. Further, the position adjusting part 73 may finely adjust the position of the rotation restricting part 71 in use of the bracket 40.

Moreover, the nut 53$c$ (adjustment amount fixing part) fixes an amount of adjustment executed by the position adjusting part 73. Specifically, the nut 53$c$ prevents the bolt 53$b$ from being loosed from the bolt engagement part 53$a$ to keep the engagement amount of the bolt 53$b$ with respect to the bolt engagement part 53$a$. This results in maintaining the position of the crawler lifting section 65 in the left-right direction relative to the position of the gravity center 30$g$ in the left-right direction. The nut 53$c$ accordingly fixes the amount of adjustment executed by the position adjusting part 73. This eliminates the need for the position adjusting part 73 to execute the adjustment at every time of lifting the crawler 30.

The crawler 30 in the lifted state preferably avoids inclining in the front-rear direction of the crawler 30 shown in FIG. 3 with respect to the horizontal plane. Specifically, for instance, the position of the gravity center 30$g$ of the crawler 30 in the front-rear direction is set to fall between the front bracket 43 and the rear bracket 50 in the front-rear direction. As shown in FIG. 1, ropes 66$b$ having the same length are respectively attached to the front bracket 43 and the rear bracket 50. More specifically, a length of the rope 66$b$ extending from the unillustrated hook of the auxiliary crane to the shackle 66$a$ to be attached to the front bracket 43 is same as a length of the rope 66$b$ extending from the hook to the shackle 66a to be attached to the rear bracket 50. In this case, the crawler 30 in the lifted state can be horizontal or substantially horizontal in the longitudinal direction (front-rear direction) of the crawler 30. Moreover, the crawler 30 can be horizontal or substantially horizontal in the longitudinal direction (front-rear direction) even without an adjustment of a difference in the length between the rope 66b to be attached to the front bracket 43 and the rope 66b to be attached to the rear bracket 50. However, the difference in the length between the front and rear ropes 66b may be adjusted so that the crawler 30 is horizontal or substantially horizontal in the longitudinal direction. The front and rear bracket connection part 41 with a larger dimension in the front-rear direction (with a longer distance between the front bracket 43 and the rear bracket 50 in the front-rear direction) can suppress the inclination of the crawler 30 in the front-rear direction with respect to the horizontal plane more effectively.

The crawler 30 in the lifted state preferably avoids inclining in the left-right direction of the crawler 30 with respect to the horizontal plane. The crawler 30 in the lifted state further preferably avoids inclining in the up-down direction of the crawler 30 with respect to the vertical plane. Specifically, for instance, the gravity center 30g of the crawler 30 is preferably on an outer side of a left-right directional inner end of the bracket 40 shown in FIG. 5 in the left-right direction and on an inner side of a left-right directional outer end of the bracket 40 in the left-right direction. Moreover, the gravity center 30g of the crawler 30 is preferably below an upper end of the bracket 40 and above the lower end of the bracket 40.

Crawler-Side Attached Part 33

The crawler-side attached part 33 has the crawler pin hole 33a that is a through hole. The crawler pin hole 33a hence can directly receive a lifting tool be placed therein. The crawler-side attached part 33 can serve as a lifting ring Ro for directly receiving the lifting tool to be placed therein. For instance, the crawler-side attached part 33 may be utilized as the lifting ring Ro in unavailability of the bracket 40. For instance, a user (of the working machine 1) who needs no bracket 40 utilizes the crawler-side attached part 33 as the lifting ring Ro. In contrast, another user who uses the bracket 40 utilizes the crawler-side attached part 33 for attachment of the bracket 40. It is seen from these perspectives that there is no need to change the configuration of the crawler 30 differently between the user who needs no bracket 40 and the user who needs the bracket 40.

A crawler 30 of a conventional working machine may have a lifting ring Ro. In this case, an attaching part 61 included in a bracket 40 may have a configuration with a shape, a size, and other structure suitable for engagement with the conventional lifting ring Ro. The bracket 40 having this configuration is attachable to the crawler-side attached part 33 without any modification to the conventional lifting ring Ro.

In no use of the bracket 40, the crawler 30 is liftable, for example, in a manner to be described below. A pair of lifting rings Ro (lifting plates) each protruding from the crawler frame outer surface 31o (i.e., a side-plate outer surface 31oc, see FIG. 5) outward in the left-right direction shown in FIG. 2 are provided at a distance therebetween in the front-rear direction (see FIG. 3). Similarly, a pair of lifting rings Ri each protruding from the crawler frame inner surface 31i inward in the left-right direction are provided at a distance therebetween in the front-rear direction. An unillustrated lifting tool is placed in each of the lifting rings Ro, Ri. Specifically, a shackle is, for example, placed in each of the lifting rings Ro, Ri. An unillustrated rope is engaged with the shackle. An unillustrated shoe guard is provided between the rope and the crawler belt 35 (crawler shoes 35a, see FIG. 3). The auxiliary crane lifts the crawler 30 via the lifting tool (such as a shackle and a rope).

This conventional configuration has the following problems. Specifically, there is a need for a work of placing the lifting tool in the lifting ring Ri protruding from the crawler frame inner surface 31i inward in the left-right direction. This work is laborious in a narrow space between the crawler frame inner surface 31i and a traveling body main part 13a. Similarly, a reverse work of removing the lifting tool from the lifting ring Ri is also laborious in the narrow space. Additionally, works of attaching and detaching the shoe guard are also laborious. In contrast, the embodiment only includes the works of attaching and detaching the bracket 40 to and from the crawler frame outer surface 31o (i.e., the crawler-side attached part 33) without the works of attaching and detaching the bracket 40 to and from the crawler frame inner surface 31i. This eliminates the need for the works in the narrow space between the crawler frame inner surface 31i and the traveling body main part 13a. Moreover, the circuitous part 63 shown in FIG. 5 can suppress an interference between the bracket 40 and the crawler belt 35. Consequently, the work of attachment and detachment of the shoe guard is excludable.

The crawler hanging device 20 shown in FIG. 2 provides the following advantageous effects.

The crawler hanging device 20 includes the bracket 40 to be attached to the crawler 30. The crawler 30 includes the crawler frame 31 attachable to the traveling body main part 13a and the crawler belt 35 wound on the periphery of the crawler frame 31. The crawler frame 31 has the crawler frame outer surface 31o that is opposite to the surface via which the crawler frame is attached to the traveling body main part 13a in the left-right direction. As shown in FIG. 5, the bracket 40 includes the attaching part 61, the circuitous part 63, and the crawler lifting section 65.

In the embodiment, the attaching part 61 is attached to the crawler frame outer surface 31o. The circuitous part 63 is connected to the attaching part 61. The circuitous part 63 is partially arranged below and above the crawler belt 35 on the outer side thereof in the left-right direction, and extends around the crawler belt 35. The crawler lifting section 65 is connected to the circuitous part 63, is arranged above the crawler belt 35, and receives the crawler lifting tool 66 for lifting the crawler 30.

The bracket 40 is partially arranged above the crawler 30 on an outer side thereof in the left-right direction. The attaching part 61 of the bracket 40 is attached to the crawler frame outer surface 31o. With this configuration, an operator can perform the works of attaching and detaching the bracket 40 to and from the crawler frame 31 on the outer side of the crawler frame 31 in the left-right direction. This eliminates the need for the operator to perform the work in the narrow space between the crawler frame 31 and the traveling body main part 13a (sec FIG. 2). Moreover, the circuitous part 63 can suppress an interference between crawler belt 35 and the bracket 40. This further eliminates the need for the operator to perform works of preparing an additional member (e.g., a shoe guard) for preventing a contact between a member for lifting the crawler 30 and the crawler belt 35, and attaching and detaching the additional member. Accordingly, the works of attaching and detaching members for lifting the crawler 30 to and from the crawler 30 can be facilitated. It is consequently possible to easily perform the work concerning lifting of the crawler 30.

In the embodiment, as shown in FIG. 5, the attaching part 61 is attached to the crawler frame outer surface 31o rotatably about the rotational axis A extending in the front-rear direction. The bracket 40 includes the rotation restricting part 71 linked to the attaching part 61. The rotation restricting part 71 is brought into contact with the crawler frame outer surface 31o.

Further, the rotation restricting part 71 is brought into contact with the crawler frame outer surface 31o when the bracket 40 is attached to the crawler 30. This can stabilize the state (posture, inclination) of each of the crawler 30 and the bracket 40. Specifically, the rotation restricting part 71 is brought into contact with the crawler frame outer surface 31o to restrict a rotation of the crawler 30 about the rotational axis A in the lifted state of the crawler 30. Therefore, the rotation of the crawler 30 with respect to the bracket 40 can be restricted with the simpler configuration than a configuration where a rotation of a crawler 30 is restricted with respect to a bracket 40 by way of, for example, a pin (other than the pin P). Similarly, the rotation of the bracket 40 with respect to the crawler 30 can be restricted when the bracket 40 is attached to the crawler 30 in the non-lifted state of the crawler 30.

In the embodiment, the rotation restricting part 71 is below the rotational axis A. The gravity center 40g of the bracket 40 is on the outer side of the rotational axis A in the left-right direction when the attaching part 61 is attached to the crawler frame outer surface 31o and the rotation restricting part 71 is in contact with the crawler frame outer surface 31o in the attaching state of the bracket 40.

The above-described configuration provides the following advantageous effects. The lower portion of the bracket 40 (including the rotation restricting part 71) below the gravity center 40g may rotate inward in the left-right direction under the weight of the bracket 40 when the bracket 40 is attached to the crawler 30 in the non-lifted state of the crawler 30. The weight of the bracket 40 enables the rotation restricting part 71 to come into contact with the crawler frame outer surface 31o. As a result, the rotation of the bracket 40 about the rotational axis A can be restricted. The simpler configuration can accordingly restrict the rotation of the bracket 40 than a configuration where the rotation is restricted by way of, for example, a pin (different from the pin P).

In the embodiment, the rotation restricting part 71 is below the rotational axis A. The bracket 40 has the bracket lifting section 67. The bracket lifting section 67 is located in the upper portion of the bracket 40 for receiving the bracket lifting tool 68 for lifting the bracket 40. The relevant location or arrangement is as follows when the bracket 40 is attached to the crawler frame outer surface 31o and the rotation restricting part 71 is in contact with the crawler frame outer surface 31o in the attaching state of the bracket 40. The gravity center 40g of the bracket 40 is on the inner side of the bracket lifting section 67 in the left-right direction.

In this configuration, the rotation restricting part 71 is below the rotational axis A of the attaching part 61. The gravity center 40g of the bracket 40 is on the inner side of the bracket lifting section 67 in the left-right direction in the attaching state of the bracket 40. Owing to this arrangement, the aforementioned interference of the rotation restricting part 71 with the crawler frame outer surface 31o that may occur when the bracket 40 is attached to and detached from the crawler frame outer surface 31o can be suppressed. It is consequently possible to easily perform the works of attaching and detaching the bracket 40 to and from the crawler 30.

As shown in FIG. 3, the bracket 40 includes the front bracket 43 and the rear bracket 50. As shown in FIG. 5, the front bracket 43 includes the attaching part 61, the circuitous part 63, and the crawler lifting section 65. As shown in FIG. 3, the rear bracket 50 is at a distance from the front bracket 43 in the front-rear direction. As shown in FIG. 5, the rear bracket 50 includes an attaching part 61, a circuitous part 63, and a crawler lifting section 65 other than the attaching part 61, the circuitous part 63, and the crawler lifting section 65 of the front bracket 43.

As shown in FIG. 3, the front and rear bracket connection part 41 is connected to the front bracket 43 and the rear bracket 50, and fixedly connects the front bracket 43 and the rear bracket 50 with each other in the front-rear direction.

The front and rear bracket connection part 41 can encourage a front-rear directional force acting on the front bracket 43 and the rear bracket 50. This results in successfully suppressing a deformation of each of the front bracket 43, the rear bracket 50, and a specific part (e.g., the crawler-side attached part 33) of the crawler 30 to which the bracket 40 is to be attached. This configuration further enables smoother attachment and detachment by integrally attaching and detaching the front bracket 43 and the rear bracket 50 to and from the crawler frame 31 than a configuration including a front bracket 43 and a rear bracket 50 independent of (disconnected from) each other. It is consequently possible to easily perform the works of attachment and detachment.

As shown in FIG. 5, the crawler hanging device 20 further includes the pin P which connects the crawler frame outer surface 31o and the attaching part 61 to each other. The crawler 30 has the crawler pin hole 33a that is a through hole for allowing the pin P to be placed therein.

In the configuration, the crawler frame 31 has the through hole in a specific part (the crawler-side attached part 33) thereof to which attaching part 61 is attached. The crawler-side attached part 33 can serve as the lifting ring Ro.

The bracket 40 in the embodiment provides the following advantageous effects. The bracket 40 is a member for lifting the crawler 30 (lifting target). As shown in FIG. 1, the bracket 40 includes the front bracket 43, the rear bracket 50, and the front and rear bracket connection part 41.

The front bracket 43 has a curve shape. The rear bracket 50 has a curve shape and is at a distance from the front bracket 43 in the front-rear direction of the crawler 30.

The front and rear bracket connection part 41 is connected to the front bracket 43 and the rear bracket 50, and fixedly connects the front bracket 43 and the rear bracket 50 with each other.

As shown in FIG. 5, each of the front bracket 43 and the rear bracket 50 includes the attaching part 61, the rotation restricting part 71, the position adjusting part 73, the crawler lifting section 65 (lifting-target lifting section), and the bracket lifting section 67.

The attaching part 61 is attached to the crawler frame outer surface 31o (lifting-target outer surface) that is the left-right directional outer surface of the crawler 30. The rotation restricting part 71 is linked to the attaching part 61, is located below the attaching part 61, and is brought into contact with the crawler frame outer surface 31o.

The position adjusting part 73 is provided between the attaching part 61 and the rotation restricting part 71 for adjusting the position of the rotation restricting part 71 in the left-right direction relative to the frame 51 connecting the attaching part 61 and the rotation restricting part 71 with each other.

The crawler lifting section 65 is connected to the attaching part 61. The crawler lifting section 65 receives the lifting tool (crawler lifting tool 66) for lifting the crawler 30.

In this configuration, the attaching part 61 is attached to the crawler frame outer surface 31*o*, and the crawler lifting section 65 for receiving the lifting tool for lifting the crawler 30 is arranged thereabove. Meanwhile, if each of the front bracket 43 and the rear bracket 50 has such a shape as to, for example, linearly connect the attaching part 61 and the crawler lifting section 65 with each other, the bracket 40 and the crawler 30 may interfere with each other. To avoid the interference, each of the front bracket 43 and the rear bracket 50 has the curve shape in the configuration. This configuration can accordingly suppress the interference of each of the front bracket 43 and the rear bracket 50 with the crawler 30.

The front and rear bracket connection part 41 provides the same advantageous effects as those of the above-described bracket connection part 41. The attaching part 61 provides the same effects as those of the above-described attaching part 61. The rotation restricting part 71 provides the same effects as those of the above-described rotation restricting part 71.

As shown in FIG. 5, the position adjusting part 73 adjusts the position of the rotation restricting part 71 relative to the frame 51 in the left-right direction. In this way, the position (relative position) of the bracket 40 relative to the crawler 30 in the left-right direction is adjustable. This results in, for example, a successful adjustment of the position of the crawler lifting section 65 relative to the crawler 30 (e.g., the gravity center 30*g*) in the left-right direction.

The bracket lifting section 67 is above (right above or substantially right above) the gravity center 30*g* of the crawler 30.

The bracket lifting section 67 is connected to the attaching part 61. The bracket lifting section 67 receives the lifting tool (bracket lifting tool 68) for lifting each of the front bracket 43 and the rear bracket 50. The gravity center 40*g* of the bracket 40 (assembly) is located in a manner described below when the front bracket 43 and the rear bracket 50 are attached to the crawler frame outer surface 31*o* and the rotation restricting part 71 is in contact with the crawler frame outer surface 31*o*. The bracket 40 has such a shape that the gravity center 40*g* is on a positional line on which the bracket lifting section 67 is located or on an inner side of the bracket lifting section 67 on the positional line with respect to the left-right direction. The gravity center 40*g* further serves as a gravity center of each of the front bracket 43, the rear bracket 50, and the front and rear bracket connection part 41 shown in FIG. 1.

Owing to the location of the gravity center 30*g*, the crawler 30 in the lifted state can avoid inclining with respect to the horizontal plane. Additionally, the rotation restricting part 71 avoids interfering with the crawler frame outer surface 31*o*, or the crawler frame outer surface 31*o* receives no reaction force when the bracket 40 is attached to and detached from the crawler frame outer surface 31*o* in the location of the gravity center 40*g*. The location or arrangement can consequently facilitate the works of attaching and detaching the bracket 40 to and from the crawler frame outer surface 31*o*.

Second Embodiment

Differences from the first embodiment will be described with reference to FIGS. 8 and 9 for a crawler hanging device 220 according to a second embodiment of the present invention. Here, descriptions for the same configurations included in the crawler hanging device 220 according to the second embodiment as those according the first embodiment will be omitted. Main differences are seen in a front and rear bracket connection part 241 and a fastening member 242 shown in FIG. 8, and in a position where a rotation restricting part 71 is brought into contact with a crawler frame outer surface 31*o*, a lifting ring Ro, and a pin P each shown in FIG. 9.

The front and rear bracket connection part 241 (see FIG. 8) has a configuration to be described below. In the preceding first embodiment (FIG. 3), the front and rear bracket connection part 41 has a plate shape, and is, for example, fixedly welded to the front bracket 43 and the rear bracket 50 (by way of plate welding). In contrast, in the embodiment, as shown in FIG. 8, the front and rear bracket connection part 241 is fastened to a front bracket 43 and a rear bracket 50 with the fastening member 242. The front and rear bracket connection part 241 has a connection-part main body member 241*a* and a shim member 241*b*.

The connection-part main body member 241*a* has, for example, a rod-like tubular or pipe shape, or a rod-like solid shape. The connection-part main body member 241*a* has an engagement part (e.g., a threaded hole) for the fastening member 242. The connection-part main body member 241*a* may have a plate shape (see FIG. 3) in the existence of the fastening member 242.

The shim member 241*b* is a member for adjusting a length of the front and rear bracket connection part 241 in the front-rear direction. For instance, the shim member 241*b* serves as a spacer provided at least one of a position between the connection-part main body member 241*a* and the front bracket 43 and a position between the connection-part main body member 241*a* and the rear bracket 50.

The shim member 241*b* is used, for example, in a manner described below. A plurality of front and rear bracket connection parts 241 may be provided, for example, at a lower position and a higher position. In this case, a distance between the front bracket 43 and the rear bracket 50 in the front-rear direction concerning the (first) front and rear bracket connection part 241 at the higher position may differ from a distance therebetween concerning the (second) front and rear connection part 241 at the lower position. Here, the front and rear bracket connection part 241 (e.g., at the higher position) with the shorter distance is provided with no shim member 241*b*. In contrast, the front and rear bracket connection part 241 (e.g., at the lower position) with the longer distance is provided with one or more shim member 241*a* (two shim members in FIG. 8). Accordingly, the connection-part main body member 241*a* is adoptable for each of the front and rear bracket connection part 241 at the higher position and the front and rear bracket connection part 241 at the lower position in the same manner. Additionally, each of the front and rear bracket connection part 241 at the higher position and the front and rear bracket connection part 241 at the lower position may be provided with the shim member 241*b*. In this case, the distance between the front bracket 43 and the rear bracket 50 in the front-rear direction is adjustable.

The fastening member 242 fastens at least one of the front bracket 43 and the rear bracket 50, and the front and rear bracket connection part 241 to each other with a relative position between the front bracket 43 and the rear bracket 50 being adjustable. In the example shown in FIG. 8, the fastening member 242 fastens the front bracket 43 and the front and rear bracket connection part 241 to each other. In the example, the fastening member 242 further fastens the rear bracket 50 and the front and rear bracket connection part 241 to each other. The front bracket 43 and the front and rear bracket connection part 241 may be fixedly welded to each other while the fastening member 242 fastens the rear bracket 50 and the front and rear bracket connection part 241 to each other (and vice versa). Hereinafter, the fastening member 242 for fastening the rear bracket 50 and the front and rear bracket connection part 241 to each other will be mainly described.

The fastening member 242 includes, for example, a bolt for fastening by way of, for example, a thread. The fastening member 242 is engaged with the front and rear bracket connection part 241 (i.e., the connection-part main body member 241a). The fastening member 242 (e.g., a head of the bolt thereof) and the front and rear bracket connection part 241 sandwich the rear bracket 50 therebetween in the front-rear direction. The sandwiching achieves fastening of the rear bracket 50 and the front and rear bracket connection part 241 to each other. The rear bracket 50 (i.e., a frame 51) has a fastening hole 251c (e.g., a bolt hole) for allowing the fastening member 242 to pass therethrough. The fastening member 242 has a dimension (e.g., a diameter) smaller than a dimension (e.g., a diameter) of the fastening hole 251c in its portion to pass through the fastening hole 251c. In this configuration, the position of the front and rear bracket connection part 241 relative to the rear bracket 50 in a direction perpendicularly intersecting the front-rear direction is adjustable in a state where the fastening by the fastening member 242 is loosened. This results in a successful adjustment of the position of the rear bracket 50 relative to the front bracket 43 in the direction perpendicularly intersecting the front-rear direction. The fastening hole 251c may be a circular hole or a long hole when seen in the front-rear direction. The fastening member 242 may be a nut. Specifically, the connection-part main body member 241a may be formed with a male thread (engagement part of the fastening member 242), and the fastening member 242 may formed with a female thread. In this case, the connection-part main body member 241a may pass through the fastening hole 251c, and two fastening members 242 (nuts) may sandwich the rear bracket 50 in the front-rear direction.

Details of Positional Adjustment for Rear Bracket 50 and Front Bracket 43

The relative position between the crawler-side attached parts 33 in the front-rear direction as shown in FIG. 3 deviates due to a welding distortion, a manufacturing tolerance, or other cause. The front bracket 43, the rear bracket 50, and the front and rear bracket connection part 41 may be fixedly welded to one another. In this case, a relative position between the attaching part 61 of the front bracket 43 (see FIG. 5) and the attaching part 61 of the rear bracket 50 also deviates due to the welding distortion, the manufacturing tolerance, or other cause. Under the circumstances, the crawler pin hole 33a and the bracket pin hole 61a in the front bracket 43 may fail to align with each other while the crawler pin hole 33a and the bracket pin hole 61a in the rear bracket 50 align with each other (and vice versa). Here, the pin P cannot pass through the pin holes, resulting in a failure to attach the bracket 40 to the crawler 30. The failure necessitates an additional effort of separating the front bracket 43, the rear bracket 50, and the front and rear bracket connection part 41 from one another at their welded portions, and rewelding the brackets and the part together.

Figure 8:
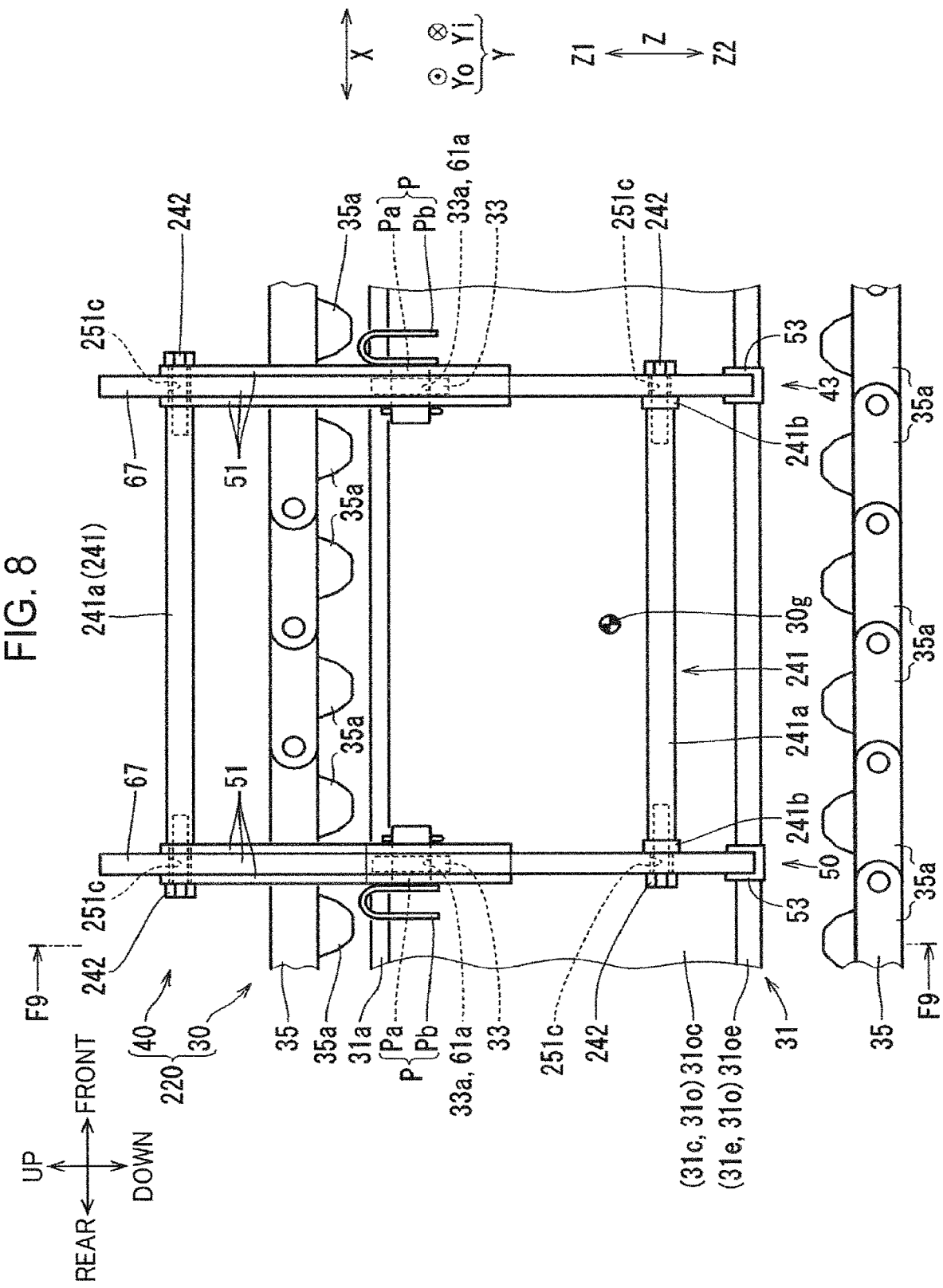
FIG. 8 is an enlarged sideview of a crawler onto which a crawler hanging device according to a second embodiment of the present invention is mounted.

In contrast, according to the embodiment, the fastening member 242 can adjust the position of the front bracket 43 relative to the rear bracket 50 in the direction perpendicularly intersecting the front-rear direction as shown in FIG. 8. Accordingly, the position of the bracket pin hole 61a relative to the crawler pin hole 33a is also adjustable, that is, the positional misalignment is absorbable. As a result, the crawler pin hole 33a and the bracket pin hole 61a can firmly receive the pin P. The bracket 40 therefore can be reliably attached to the crawler 30.

Meanwhile, presumed is a case where a specific single bracket 40 is used peculiarly to a corresponding single crawler 30 without being used for another crawler 30. In this case, the front bracket 43, the rear bracket 50, and the front and rear bracket connection part 241 may be fixedly welded to one another after the positional adjustment for the pin holes is executed. Further, in a case where the front and rear bracket connection part 41 is fixedly welded to the front bracket 43 and the rear bracket 50 as shown in FIG. 4, the welding may be executed in a state where the positional adjustment for the pin holes is executed.

Position where Rotation Restricting Part 71 is Brought into Contact with Crawler Frame Outer Surface 31o In the preceding first embodiment (FIG. 5), the rotation restricting part 71 is brought into contact with the side-plate outer surface 31oc. In the embodiment, the rotation restricting part 71 is brought into contact with a bottom member outer surface 31oe as shown in FIG. 9. The crawler frame 31 can withstand a larger load in this configuration than in the configuration where the rotation restricting part 71 is brought into contact with the side-plate outer surface 31oc. The details of the operational action will be described below. The load depending on the weight of the crawler 30 acts on a pin P when the crawler 30 is lifted by way of the bracket 40. A central axis (rotational axis A) of the pin P is not on a positional line on which the gravity center 30g of the crawler 30 is. Thus, a moment based on a directional gravity that the gravity center 30g shifts downward and outward in the left-right direction arises around the rotational axis A. The rotation restricting part 71 bears the moment. Specifically, a left-right directional inner force acts on the crawler frame outer surface 31o from the rotation restricting part 71. An increase in the weight of the crawler 30 causes an increase in the moment. As a result, a larger force acts on the crawler frame outer surface 31o from the rotation restricting part 71.

In the preceding first embodiment (FIG. 5), the rotation restricting part 71 is brought into contact with the side-plate outer surface 31oc of the side-plate 31c. The side-plate 31c extends in a direction (up-down direction) perpendicularly intersecting the left-right direction, and receives a left-right directional inner force acting thereon from the rotation restricting part 71. Thus, the side-plate 31c may deform (i.e., a deformation amount may exceed a permissible range). In contrast, in the embodiment, the rotation restricting part 71 is brought into contact with the bottom member outer surface 31oe of the bottom member 31e as shown in FIG. 9. A width dimension of the bottom member 31e in the left-right direction is set to be larger than a width dimension of the side-plate 31c in the left-right direction. Hence, the bottom member 31e can encourage the left-right directional inner force from the rotation restricting part 71 more reliably than the side-plate 31c. The configuration where the bottom member 31e receives the left-right directional inner force acting thereon from the rotation restricting part 71 can consequently suppress the deformation of the crawler frame 31 more effectively than the configuration where the side-plate 31c receives the corresponding force.

The configuration where the rotation restricting part 71 is brought into contact with the bottom member outer surface 31oe can reduce a strength required for the bracket 40 more effectively than the configuration where the rotation restricting part 71 is brought into contact with the side-plate outer surface 31oc. The details of the operational action will be described below. As described above, a moment based on a directional gravity that the gravity center 30g of the crawler 30 shifts downward and outward in the left-right direction arises around the rotational axis A when the crawler 30 is lifted by way of the bracket 40. A moment (counter-moment) resisting against the aforementioned moment and acting on the crawler frame outer surface 31o from the rotation restricting part 71 arises around the rotational axis A. Here, a distance from the rotational axis A to the rotation restricting part 71 is longer in the configuration where the rotation restricting part 71 is brought into contact with the bottom member outer surface 31oe than in the configuration where the rotation restricting part 71 is brought into contact with the side-plate outer surface 31oc. It is seen from this perspective that the force acting on the side-plate outer surface 31oc from the rotation restricting part 71 decreases due to the longer distance from the rotational axis A to the rotation restricting part 71 even at the same "counter-moment". The decrease in the force can consequently contribute to a reduction in the strength of the bracket 40 required to support the rotation restricting part 71.

The rotation restricting part 71 may be brought into contact with both the side-plate outer surface 31oc and the bottom member outer surface 31oe (not shown). Even this configuration can suppress the deformation of the crawler frame 31 and reduce the strength required for the bracket 40 as described above.

The lifting ring Ro has the following configuration. In the preceding first embodiment (FIG. 5), the crawler-side attached part 33 can serve as the lifting ring Ro. For instance, a conventional lifting ring Ro is available as the crawler-side attached part 33. In contrast, in the embodiment, the crawler-side attached part 33 and the lifting ring Ro are provided individually as shown in FIG. 9. For instance, the lifting ring Ro is attached to a lower portion of the crawler frame 31 (e.g., in the vicinity of an end thereof). Therefore, it may be difficult to utilize the lifting ring Ro as the crawler-side attached part 33. The crawler-side attached part 33 is hence arranged above the lifting ring Ro independently of the lifting ring Ro, e.g., the crawler-side attached part 33 is further provided in addition to the lifting ring Ro. The crawler-side attached part 33 is attached to, for example, an upper portion of the crawler frame 31.

The pin P has a pin main body part Pa and a pin catching part Pb as shown in FIG. 8. The pin main body part Pa is a part to be inserted in the crawler pin hole 33a and the bracket pin hole 61a. The pin catching part Pb permits an operator to easily place and remove the pin P. The pin catching part Pb is attached (e.g., fixedly attached) to an axial end of the pin main body part Pa. The pin catching part Pb has such a shape, for example, as to allow a finger to be held thereon, e.g., a U-shape.

The crawler hanging device 220 provides the following advantageous effects.

Figure 9:
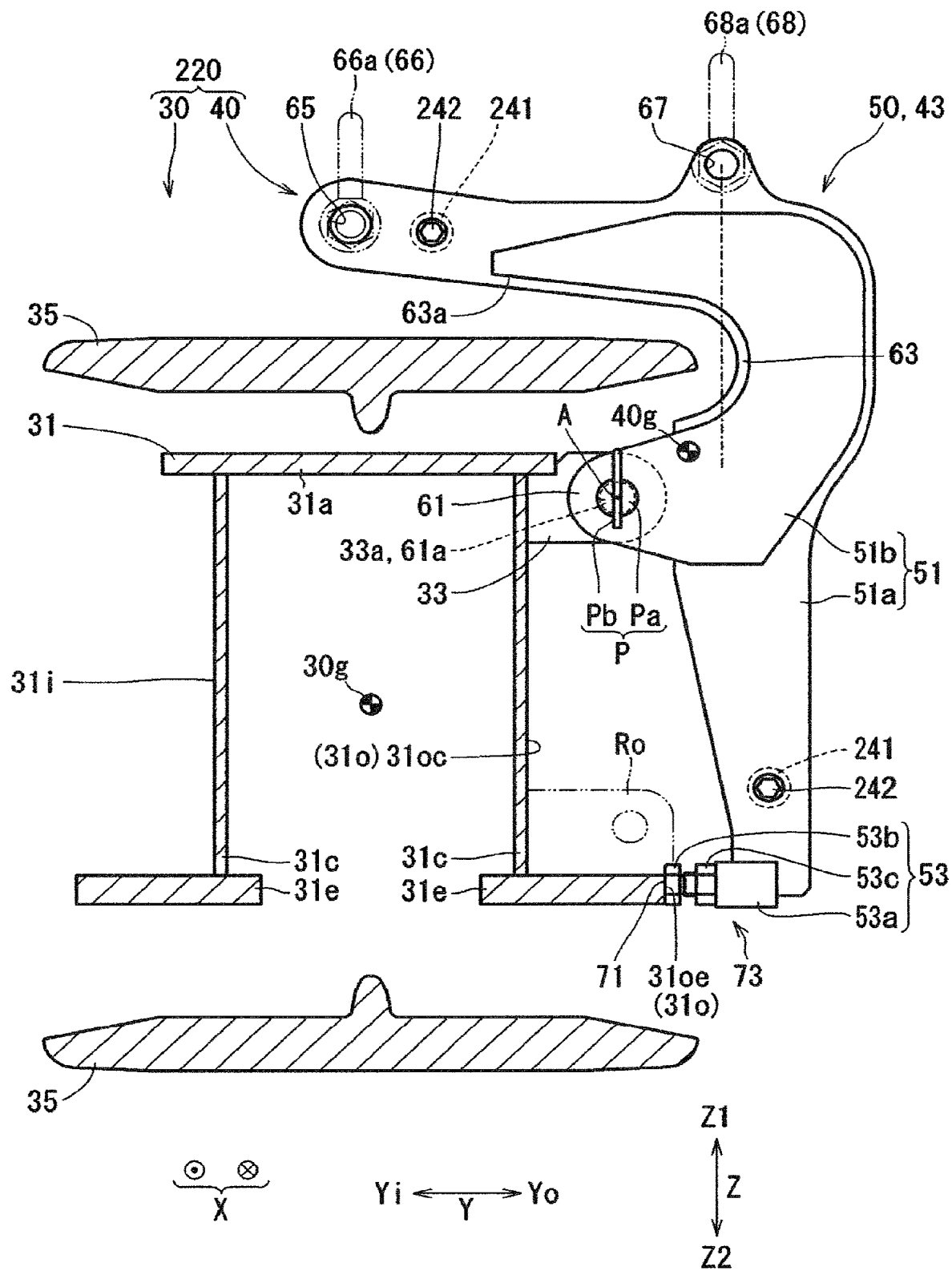
FIG. 9 is a cross-sectional view of the crawler and the crawler hanging device taken along the arrows F9-F9 in FIG. 8.

As shown in FIG. 9, the crawler frame 31 has the side-plate 31 and the bottom member 31e. The side-plate 31c extends in a direction perpendicularly intersecting the left-right direction. The bottom member 31e lies below the side-plate 31c. The bottom member 31e has a width in the left-right direction larger than a width of the side-plate 31c in the left-right direction. The crawler frame outer surface 31o incorporates the side-plate outer surface 31oc and the bottom member outer surface 31oe. The side-plate outer surface 31oc serves as a left-right directional outer surface of the side-plate 31c. The bottom member outer surface 31oc serves as a left-right directional outer surface of the bottom member 31e.

The rotation restricting part 71 is below the rotational axis A and is brought into contact with the bottom member outer surface 31oe.

This configuration brings the rotation restricting part 71 into contact with the crawler frame outer surface 31o at a position farther away from the rotational axis A than the position in the configuration which brings the rotation restricting part 71 into contact with only the crawler frame outer surface 31o (e.g., the side-plate outer surface 31oc) above the bottom member outer surface 31oe. The configuration accordingly achieves an increase in the moment of the force acting on the crawler frame outer surface 31oc from the rotation restricting part 71 around the rotational axis A. As a result, the force acting on the crawler frame outer surface 31oc from the rotation restricting part 71 can be decreased. The decrease in the force can consequently contribute to a reduction in the strength of the bracket 40 required to support the rotation restricting part 71.

Like the configuration described above, the bottom member 31e has a width in the left-right direction larger than a width of the side-plate 31c in the left-right direction. The rotation restricting part 71 is brought into contact with the bottom member outer surface 31oe of the bottom member 31. This configuration can accordingly suppress the deformation of the crawler frame 31 more effectively than the configuration where the rotation restricting part 71 is brought into contact with only the side-plate outer surface 31oc without any contact with the bottom member outer surface 31oe.

As shown in FIG. 8, the crawler hanging device 220 further includes the fastening member 242. The fastening member 242 fastens at least one of the front bracket 43 and the rear bracket 50, and the front and rear bracket connection part 241 to each other with a relative position between the front bracket 43 and the rear bracket 50 being adjustable.

With this configuration, a relative position between the respective attaching parts 61 (see FIG. 9) of the front bracket 43 and the rear bracket 50 is adjustable by adjusting a relative position between the front bracket 43 and the rear bracket 50. Consequently, each of the respective attaching parts 61 of the front bracket 43 and the rear bracket 50 (see FIG. 9) is reliably attachable to a corresponding part (i.e., the crawler-side attached part 33) of the crawler frame 31 for receiving the attaching part 61 to be attached thereto.

Modifications

The present invention should not be limited to the embodiments described above, and may be modified in various ways. For instance, the structural elements of the embodiments may be combined with each other. For example, the arrangement and the shape of each of the structural elements may be changed. For instance, the number of structural elements may be changed, and the structural elements are partly excludable. For example, the structural elements may be fixed to, or connected to or with each other in a direct way or an indirect way. For example, the plurality of structural elements described as being different from one another may cover a single member or a part of a specific member. For example, the structural element described as a single member or a part of a specific member may cover a plurality of members or parts different from one another.

For instance, the rotation restricting part 71 shown in FIG. 5 may be above the rotational axis A. In this case, for example, the bracket 40 may rotate about the rotational axis A in a direction of turning over on an outer side in the left-right direction when the bracket lifting tool 68 is lowered in the state where the attaching part 61 is attached to the crawler-side attached part 33. Any way is selectable to stop the rotation of the bracket 40. Moreover, the bracket 40 may exclude the rotation restricting part 71. Furthermore, the bracket 40 does not necessarily rotate about the rotational axis A. For example, the bracket 40 may be fastened to the crawler frame outer surface 31oc via a pin or other fastener.

A target (lifting target) to be lifted by way of the bracket 40 should not be limited to the crawler 30. The lifting target may be an object which is attachable to, for example, a surface of the working machine 1 (see FIG. 1) that is a horizontally oriented surface (side surface, front surface, rear surface) serving as an attachment surface. In this case, the bracket 40 is attached to a surface (corresponding to the crawler frame outer surface 31o) of the lifting target that is opposite to the attachment surface. Specifically, the lifting target may be, for example, a step (catwalk, foothold) to be attached to a deck (frame). The lifting target may be a fence to be attached to an end of the top surface of a guard mounted on a deck, or a fence to be attached to an end of a boom. The lifting target may be a ladder to be attached to a side surface of the guard.

Provided according to the present invention is a crawler a crawler hanging device to be mounted onto a crawler for use in lifting the crawler, the crawler including a crawler frame having a pair of left and right side-surfaces and attachable to a main part of a traveling body, and a crawler belt surrounding the crawler frame from above, below, front, and rear thereof. The crawler hanging device includes at least one support member to be attached to the crawler. The at least one support member includes: an attaching part to be attached to a crawler frame outer surface that is one of the pair of side-surfaces of the crawler frame and is opposite to a side-surface via which the crawler frame is to be attached to the main part of the traveling body; a first receiving part arranged above a belt top section of the crawler belt above the crawler frame for receiving a lifting tool for lifting the crawler; and a circuitous part which connects the attaching part and the first receiving part with each other, and extends around the belt top section of the crawler belt through an outside region of the belt top section in a left-right direction of the crawler belt.

In this configuration, the attaching part is desirably attached to the crawler frame outer surface rotatably about a rotation central axis extending in a front-rear direction of the crawler. The at least one support member desirably further includes a rotation restricting part which is located away from the attaching part in an up-down direction, and is brought into contact with the crawler frame outer surface to restrict the rotation of the at least one support member about the rotation central axis.

In this configuration, the rotation restricting part is desirably below the rotation central axis. The at least one support member desirably has such a shape that a gravity center of the support member is on an outer side of the rotation central axis in the left-right direction of the crawler when the attaching part is rotatably attached to the crawler frame outer surface and the rotation restricting part is in contact with the crawler frame outer surface.

In the configuration, the attaching part is detachably attachable to the crawler frame outer surface. The rotation restricting part is desirably below the rotation central axis. The at least one support member desirably further includes, in an upper portion of the support member, a second receiving part arranged on an outer side of the first receiving part in the left-right direction of the crawler above the crawler belt for receiving another lifting tool for lifting the support member when the attaching part is attached to the crawler frame outer surface. The at least one support member desirably has such a shape that the gravity center of the support member is on an inner side of the second receiving part in the left-right direction when the at least one support member is attached to the crawler frame outer surface and the rotation restricting part is in contact with the crawler frame outer surface.

In this configuration, the at least one support member desirably further includes: a front support member; a rear support member arranged at the rear of the front support member; and a connection part which connects the front support member and the rear support member with each other in a front-rear direction of the crawler.

In this configuration, it is desired to further include a fastening member which fastens at least one of the front support member and the rear support member, and the connection part to each other with a relative position between the front support member and the rear support member being adjustable.

In this configuration, it is desired to further include a pin which connects the crawler frame outer surface and the at least one support member to each other by passing through a crawler pin hole formed in the crawler frame outer surface and a support member pin hole formed in the attaching part.

In this configuration, the at least one support member desirably further includes a frame which connects the attaching part and the rotation restricting part with each other, and a position adjusting part which adjusts a relative position of the rotation restricting part to the frame in the left-right direction of the crawler.

In this configuration, the second receiving part is desirably above a gravity center of the crawler. The at least one support member desirably has such a shape that a gravity center of an assembly constituted by the front support member, the rear support member, and the connection part is on a positional line on which the second receiving part is located or on an inner side of second receiving part on the positional line with respect to the left-right direction when the front support member and the rear support member are attached to the crawler frame outer surface and the rotation restricting part is in contact with the crawler frame outer surface.

Additionally, provided by the present invention is a crawler for permitting the crawler hanging device according to one of the above-described configurations to be mounted thereon, the crawler including: a crawler frame having a pair of left and right side-surfaces and attachable to a main part of a traveling body; and a crawler belt surrounding the crawler frame from above, below, front, and rear thereof. The crawler frame includes: a side-plate having a side-plate outer surface defining the crawler frame outer surface, and extending in the up-down direction; and a bottom member horizontally lying below the side-plate and having a bottom member outer surface defining the crawler frame outer surface and a width dimension in the left-right direction larger than a width dimension of the side-plate in the left-right direction. The bottom member outer surface allows the rotation restricting part to come into contact therewith.

In the configuration, the bottom member is desirably connected to the side-plate in such a manner as to extend from a lower end of the side-plate at least outward in the left-right direction.

In this configuration, the side-plate desirably has an attached part for receiving the attaching part, which is to be attached to the attached part, of the at least one support member of the crawler hanging device.

The invention claimed is:

1. A crawler hanging device to be mounted onto a crawler for use in lifting the crawler, the crawler including a crawler frame having a pair of left and right side-surfaces and attachable to a main part of a traveling body, and a crawler belt surrounding the crawler frame from above, below, front, and rear thereof, the crawler hanging device comprising:
at least one support member to be attached to the crawler, wherein
the at least one support member includes:
an attaching part to be attached to a crawler frame outer surface that is one of the pair of side-surfaces of the crawler frame and is opposite to a side-surface via which the crawler frame is to be attached to the main part of the traveling body;
a first receiving part arranged above a belt top section of the crawler belt above the crawler frame for receiving a lifting tool for lifting the crawler; and
a circuitous part which connects the attaching part and the first receiving part with each other, and the circuitous part is constituted by a frame that extends around the belt top section of the crawler belt through an outside region of the belt top section in a left-right direction of the crawler belt so as to avoid an interference with the crawler belt.

2. The crawler hanging device according to claim 1, wherein
the attaching part is attached to the crawler frame outer surface rotatably about a rotation central axis extending in a front-rear direction of the crawler, and
the at least one support member further includes a rotation restricting part which is located away from the attaching part in an up-down direction, and is brought into contact with the crawler frame outer surface to restrict the rotation of the at least one support member about the rotation central axis.

3. The crawler hanging device according to claim 2, wherein
the rotation restricting part is below the rotation central axis, and
the at least one support member has such a shape that a gravity center of the support member is on an outer side of the rotation central axis in the left-right direction of the crawler when the attaching part is rotatably attached to the crawler frame outer surface and the rotation restricting part is in contact with the crawler frame outer surface.

4. The crawler hanging device according to claim 2, wherein
the attaching part is detachably attachable to the crawler frame outer surface,
the rotation restricting part is below the rotation central axis,
the at least one support member further includes, in an upper portion of the support member, a second receiving part arranged on an outer side of the first receiving part in the left-right direction of the crawler above the crawler belt for receiving another lifting tool for lifting the support member when the attaching part is attached to the crawler frame outer surface, and
the at least one support member has such a shape that the gravity center of the support member is on an inner side of the second receiving part in the left-right direction when the at least one support member is attached to the crawler frame outer surface and the rotation restricting part is in contact with the crawler frame outer surface.

5. The crawler hanging device according to claim 1, wherein
the at least one support member further includes:
a front support member;
a rear support member arranged at the rear of the front support member; and
a connection part which connects the front support member and the rear support member with each other in a front-rear direction of the crawler.

6. The crawler hanging device according to claim 5, further comprising a fastening member which fastens at least one of the front support members and the rear support member, and the connection part to each other with a relative position between the front support member and the rear support member being adjustable.

7. The crawler hanging device according to claim 1, further comprising a pin which connects the crawler frame outer surface and the at least one support member to each other by passing through a crawler pin hole formed in the crawler frame outer surface and a support member pin hole formed in the attaching part.

8. The crawler hanging device according to claim 1, wherein the at least one support member further includes a frame which connects the attaching part and the rotation restricting part with each other, and a position adjusting part which adjusts a relative position of the rotation restricting part to the frame in the left-right direction of the crawler.

9. The crawler hanging device according to claim 8, wherein
the second receiving part is above a gravity center of the crawler, and
the at least one support member has such a shape that a gravity center of an assembly constituted by the front support member, the rear support member, and the connection part is on a positional line on which the second receiving part is located or on an inner side of the second receiving part on the positional line with respect to the left-right direction when the front support member and the rear support member are attached to the crawler frame outer surface and the rotation restricting part is in contact with the crawler frame outer surface.

* * * * *